US011440229B2

(12) United States Patent
Shimada et al.

(10) Patent No.: US 11,440,229 B2
(45) Date of Patent: Sep. 13, 2022

(54) INJECTION MOLDING SYSTEM, MOLDING CONDITION CORRECTION SYSTEM, AND INJECTION MOLDING METHOD

(71) Applicant: HITACHI, LTD., Tokyo (JP)

(72) Inventors: Ryotaro Shimada, Tokyo (JP); Satoshi Arai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 125 days.

(21) Appl. No.: 16/823,518

(22) Filed: Mar. 19, 2020

(65) Prior Publication Data

US 2020/0307053 A1   Oct. 1, 2020

(30) Foreign Application Priority Data

Mar. 27, 2019 (JP) .............................. JP2019-060270
Aug. 26, 2019 (JP) .............................. JP2019-153877

(51) Int. Cl.
*B29C 45/76* (2006.01)

(52) U.S. Cl.
CPC .. *B29C 45/766* (2013.01); *B29C 2945/76949* (2013.01)

(58) Field of Classification Search
CPC .................................................. B29C 45/766
See application file for complete search history.

(56) References Cited

U.S. PATENT DOCUMENTS

2008/0290541 A1* 11/2008 Baumann ............ B29C 45/2725
264/40.6

FOREIGN PATENT DOCUMENTS

| EP | 2679376 A1 | 1/2014 |
| JP | 04-305424 A2 | 10/1992 |
| JP | 05-169507 A2 | 7/1993 |
| JP | 2002-307512 A | 10/2002 |
| JP | 2005-138448 A | 6/2005 |
| JP | 2011-152700 A | 8/2011 |
| JP | 5709328 B2 | 4/2015 |

OTHER PUBLICATIONS

Japanese Office Action dated Sep. 8, 2020 for Japanese Patent Application No. 2019-153877.

* cited by examiner

*Primary Examiner* — Timothy Kennedy
*Assistant Examiner* — Alexander A Wang
(74) *Attorney, Agent, or Firm* — Volpe Koenig

(57) ABSTRACT

An injection molding system includes: determining a manufacturing condition including a first mold and a first injection molding machine; checking whether a first actual production result acquired using the combination of the first mold and the first injection molding machine exists by searching an actual production result storage unit; and generating a correction molding condition for performing injection molding using the combination of the first injection molding machine and first mold based on first molding-machine-unique information acquired in advance for the first injection molding machine, second molding-machine-unique information acquired in advance for a second injection molding machine with which a second actual production result is acquired in combination with the first mold, and the second actual production result acquired from the actual production result storage unit when the first actual production result does not exist, and inputs the generated correction molding condition to the second injection molding machine.

14 Claims, 21 Drawing Sheets

| | | Molding machine IMB | Molding machine IMA (before correction) | Molding machine IMA (after correction) |
|---|---|---|---|---|
| Molding conditions | Maintaining pressure [MPa] | 40 | 40 | 37.5 |
| | Resin temperature [°C] | 190 | 190 | 194 |
| Comparison of molding phenomenon | Peak pressure [MPa] | 33 | 35.1 | 32.8 |
| | Peak resin temperature [°C] | 188 | 184 | 188 |

|     | Pmax   | PTmmax | PTrmax | diff Pmax | diff Tmax | int P@I | int P@H |
|-----|--------|--------|--------|-----------|-----------|---------|---------|
| Thp | Middle | Low    | Low    | Low       | Low       | Low     | High    |
| HP  | High   | Low    | Low    | Low       | Low       | High    | High    |
| IS  | High   | Low    | Low    | High      | High      | Middle  | Middle  |
| VP  | High   | Low    | Low    | High      | Low       | High    | High    |
| Tr  | High   | High   | High | High    | High      | Middle  | Low     |
| Tm  | Middle | High   | Low    | Low       | Low       | High    | Middle  |

(2)

|     | Pmax   | PTmmax | PTrmax | diff Pmax | diff Tmax | int P@I | int P@H |
|-----|--------|--------|--------|-----------|-----------|---------|---------|
| Thp | Middle | Low    | Low    | Low       | Low       | Low     | High    |
| HP  | High   | Low    | Low    | Low       | Low       | High    | High    |
| IS  | High   | Low    | Low    | High      | High      | Middle  | Middle  |
| VP  | High   | Low    | Low    | High      | Low       | High    | High    |
| Tm  | Middle | High | Low  | Low       | Low       | High    | Middle  |

(3)

|     | Pmax   | PTmmax | PTrmax | diff Pmax | diff Tmax | int P@I | int P@H |
|-----|--------|--------|--------|-----------|-----------|---------|---------|
| Thp | Middle | Low    | Low    | Low       | Low       | Low     | High    |
| HP  | High   | Low    | Low    | Low       | Low       | High    | High    |
| IS  | High   | Low    | Low    | High      | High  | Middle  | Middle  |
| VP  | High   | Low    | Low    | High      | Low       | High    | High    |

(4)

|     | Pmax   | PTmmax | PTrmax | diff Pmax | diff Tmax | int P@I | int P@H |
|-----|--------|--------|--------|-----------|-----------|---------|---------|
| Thp | Middle | Low    | Low    | Low       | Low       | Low     | High    |
| HP  | High   | Low    | Low    | Low       | Low       | High    | High    |
| VP  | High   | Low    | Low    | High  | Low       | High    | High    |

(5)

|     | Pmax   | PTmmax | PTrmax | diff Pmax | diff Tmax | int P@I | int P@H |
|-----|--------|--------|--------|-----------|-----------|---------|---------|
| Thp | Middle | Low    | Low    | Low       | Low       | Low     | High    |
| HP  | High   | Low    | Low    | Low       | Low       | High| High    |

INJECTION MOLDING SYSTEM, MOLDING CONDITION CORRECTION SYSTEM, AND INJECTION MOLDING METHOD

BACKGROUND

The present invention relates to an injection molding system, a molding condition correction system, and an injection molding method.

In Japanese Patent No. 5709328, injection molding is performed by executing a resin flow analysis on a cloud server on the basis of machine parameters, generating optimal injection conditions, and downloading the optimal injection conditions to a fully-automatic injection molding machine. Japanese Patent No. 5709328 indicates that "The plastic product manufacturing method integrates expert system architectures in upstream and downstream ends (such as machinery factories, product designing plants, and mold flow analysis software plants) by using a cloud server so as to integrate the best manufacturing solution of a plastic product in the cloud server. Furthermore, a controller of an all-electric injection molding machine can acquire the best manufacturing solution of a plastic product from the cloud server. Therefore, the schedule of the all-electric injection molding machine can be reduced, and experience of setting and adjusting the machine can be systematically stored and utilized. As a result, the loss of experienced technicians does not adversely affect manufacture, and the quality of the plastic product can be optimized".

SUMMARY

In the method disclosed in Japanese Patent No. 5709328, the optimal molding conditions are generated and molding conditions at the time of mass-production molding are acquired by analyzing the flow of the resin on the cloud server on the basis of the machine parameters. Therefore, in Japanese Patent No. 5709328, it is presupposed that the optimal molding conditions are generated in accordance with the flow analysis of the resin.

When the flow analysis of the resin is used in product design, the molding conditions, the product structure, the mold structure, and the like are optimized so that the quality of a molded article predicted from the analysis result satisfies the requested specifications. However, only theoretical optimal conditions are acquired in the resin flow analysis. In the flow analysis of the resin, a prediction error is caused between the actual molding and the theoretical optimal conditions due to the accuracy of a physical property database of the material to be used, a physical model to be used, and a difference (machine difference) unique to the molding machine that does not show up as machine parameters on a catalog.

This is because actual injection molding machines have slight machine differences that are unique even when the actual injection molding machines are manufactured under the same design, and the unique machine differences may affect the behavior of the resin.

Therefore, it is not easy to acquire the optimal molding conditions at the time of the mass-production molding with only the resin flow analysis as in Japanese Patent No. 5709328. Even when the optimal values are assumed to be found, those values may be different from the optimal values in the actual molding. In reality, the molding conditions at the time of the mass-production molding need to be adjusted while checking the molded article quality that is actually acquired with reference to the optimal molding conditions acquired in the resin flow analysis. The operation of adjusting the molding conditions is needed even when molding is performed in a certain molding machine with use of a mold with which an actual mass-production result has been acquired in another molding machine because there are machine differences between the molding machines.

The present invention has been made in view of the abovementioned problem, and an object thereof is to provide an injection molding system, a molding condition correction system, and an injection molding method capable of improving the quality of injection molding.

In order to solve the abovementioned problem, an injection molding system according to the present invention includes at least one computer each including a microprocessor and a storage apparatus. The injection molding system includes: determining a manufacturing condition that includes a combination of a first mold and a first injection molding machine; checking whether a first actual production result acquired with use of the combination of the first mold and the first injection molding machine exists by searching an actual production result storage unit; and generating a correction molding condition for performing injection molding with use of the combination of the first injection molding machine and the first mold on the basis of first molding-machine-unique information acquired in advance for the first injection molding machine, second molding-machine-unique information acquired in advance for a second injection molding machine with which a second actual production result is acquired in combination with the first mold, and the second actual production result acquired from the actual production result storage unit when the first actual production result does not exist; and inputs the generated correction molding condition to the second injection molding machine.

According to the present invention, even when the first actual production result acquired by the combination of the first mold and the first injection molding machine does not exist, the correction molding condition for performing the injection molding with use of the combination of the first injection molding machine and the first mold can be generated on the basis of the first molding-machine-unique information on the first injection molding machine, the second molding-machine-unique information on the second injection molding machine, and the second actual production result, and the generated correction molding condition can be input to the second injection molding machine when the second actual production result acquired by the combination of the first mold and the second injection molding machine exists.

BRIEF DESCRIPTION OF THE DRAWINGS

FIG. 12 is tables showing the correlation between the feature amount of the physical amount acquired from an in-mold sensor and the molding conditions to be corrected;

DETAILED DESCRIPTION OF THE EMBODIMENT

Figure 1:
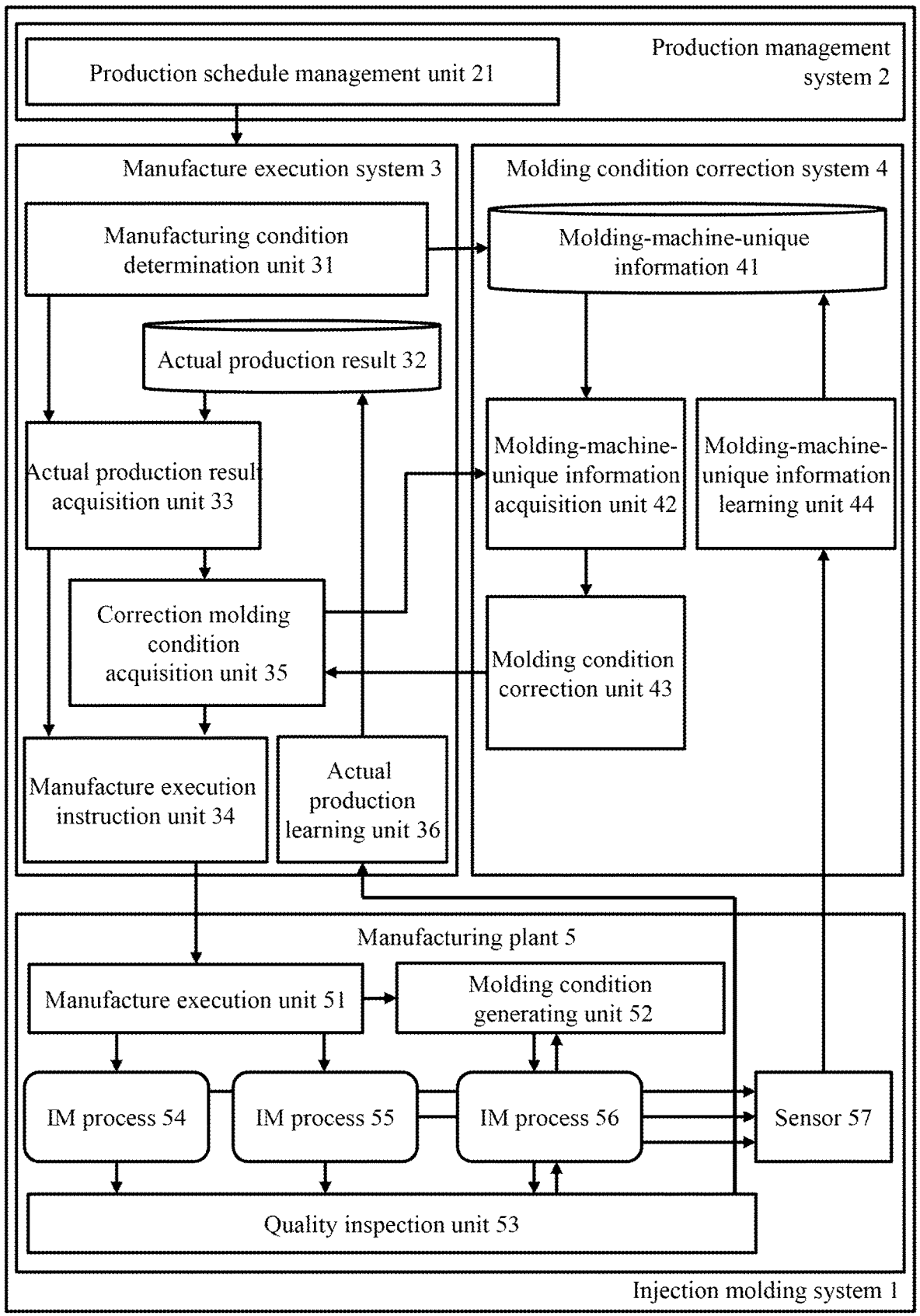
FIG. 1 is a functional block diagram of an injection molding system.

Embodiments of the present invention are described below with reference to the drawings. In this embodiment, a step of specifying a first mold and a first injection molding machine as a manufacturing condition, a step of determining whether an actual production result acquired by the first mold exists, a step of determining whether an actual production result exists for the combination of the first mold and the first injection molding machine, and a step of generating a correction molding condition for implementing injection molding by the combination of the first mold and the first injection molding machine on the basis of first molding-machine-unique information acquired in advance for the first injection molding machine, second molding-machine-unique information acquired in advance for a second injection molding machine with which an actual production result is acquired with a combination of the first mold, and the actual production result acquired by the combination of the first mold and the second injection molding machine when the actual production result acquired by the first mold exists but the actual production result acquired by the combination of the first mold and the first injection molding machine does not exist are included. The injection molding is executed by inputting the generated correction molding condition to the first injection molding machine.

According to this embodiment, when the molding is performed in a certain injection molding machine with use of a mold with which a mass-production result has been acquired with another injection molding machine, the appropriate molding condition can be acquired on the basis of the mass-production results with which non-defective products can be acquired and the molding-machine-unique information acquired in advance.

In other words, in this embodiment, when the molding is performed in a certain injection molding machine with use of a mold with which an actual production result (or a mass-production result) has been acquired with another injection molding machine, a satisfactory injection molding product is acquired by correcting the injection condition on the basis of the actual production result and the molding-machine-unique information acquired in advance.

in this embodiment, as the molding-machine-unique information, a physical amount that corresponds to a machine difference unique to the injection molding machine is acquired in advance, and is stored in correspondence with the injection molding machine. In this embodiment, it is determined whether the actual production result acquired by the combination of a certain mold and the injection molding machine exists. When the actual production result does not exist, the correction molding condition is generated from the actual production result and the molding-machine-unique information acquired in advance. In the injection molding method according to this embodiment, the injection molding by the combination of the mold and the injection molding machine defined by the manufacturing condition can be implemented with use of the correction molding condition.

Therefore, according to this embodiment, when molding is performed in a certain injection molding machine with use of a mold with which an actual production result has been acquired with another injection molding machine, an injection molding condition that is more appropriate as compared the related art can be acquired on the basis of the actual production result with which non-defective products can be acquired and the molding-machine-unique information acquired in advance. As a result, for example, when a mold with which production has been performed at a certain base is moved to another base to perform production thereat, condition configuration by a skilled worker is unnecessary. Thus, the production lead time can be reduced and the molded article quality can be improved.

Note that, in this embodiment, a mold displacement amount, speed, pressure, and temperature are described as examples of the physical amount relating to the injection molding, but the physical amount may be a certain predetermined value, or may be a curve (characteristic line) indicating the time variation of a value.

Embodiment 1

Embodiment 1 is described with reference to FIG. 1 to FIG. 12. FIG. 1 is a functional block diagram of an injection molding system (or an injection molding method) 1.

The injection molding system 1 includes a production management system 2, a manufacture execution system 3, a molding condition correction system 4, and a manufacturing plant 5, for example. Some or all of the functions of the injection molding system 1 described below may be configured as software, implemented as co-operation of software and hardware, or implemented with use of hardware having a fixed circuit. At least some of those functions may be implemented with use of hardware capable of changing some circuits. At least some of the functions of the production management system 2, the manufacture execution system 3, and the manufacturing plant 5 may be manually executed by an operator.

The production management system 2 is a system that manages a production schedule, and includes at least a production schedule management unit 21. The production schedule management unit 21 has a function of generating a production schedule including production specifications, quantity, period, and the like in accordance with the order status and the stock status.

The manufacture execution system 3 is a system that instructs the manufacturing plant 5 to execute the production. The manufacture execution system 3 determines manufacturing conditions and molding conditions on the basis of the production schedule generated by the production management system 2, and transmits the production instruction including the manufacturing conditions and the molding conditions to the manufacturing plant 5. The manufacturing conditions include information that specifies an injection molding machine to be used in the production (injection molding), information that specifies a mold to be used in the production, information that specifies the material to be used in the production, the quantity of molded articles to be produced, and the production period, for example.

The manufacture execution system 3 is described. The manufacture execution system 3 includes a manufacturing condition determination unit 31, an actual production result storage unit 32, an actual production result acquisition unit 33, a manufacture execution instruction unit 34, a correction molding condition acquisition unit 35, and an actual production result learning unit 36, for example.

The manufacturing condition determination unit 31 has a function of specifying the manufacturing conditions on the basis of the production schedule generated by the production schedule management unit 21 of the production management system 2. The manufacturing condition determination unit 31 can transmit information relating to the manufacturing conditions to the molding condition correction system 4. The information relating to the manufacturing conditions can include predetermined information relating to a first mold and a first injection molding machine. The predetermined information includes the capacity of the first mold and a runner configuration of the first mold, for example. As the predetermined information, the control mode (PID (Proportional-Integral-Differential), the configuration value, and the like) of the first injection molding machine may be further included. Note that the manufacturing condition determination unit 31 can transmit one or both of CAD (Computer Aided Design) data of the first mold, and specification data and configuration data of the first injection molding machine to the molding condition correction system 4 as the "predetermined information". The molding condition correction system 4 stores the information received from the manufacturing condition determination unit 31 in molding-machine-unique information 41.

The actual production result storage unit 32 has a function of storing the actual production result therein. In this embodiment, the actual production result means molding conditions with which a satisfactory molded article quality is confirmed to be acquired for the combination of the injection molding machine and the mold.

The actual production result acquisition unit 33 has a function of acquiring the actual production result from the actual production result storage unit 32. The actual production result acquisition unit 33 reads and acquires the actual production result acquired by the mold (hereinafter referred to as the first mold) specified by the manufacturing condition determination unit 31, and the actual production result acquired by the combination of the injection molding machine (referred to as the first injection molding machine) specified by the manufacturing condition determination unit 31 and the first mold from the actual production result storage unit 32.

The actual production result acquisition unit 33 requests the manufacture execution instruction unit 34 to set the molding conditions when the actual production result acquired by the first mold does not exist. The request for setting the molding conditions means the instruction for searching appropriate molding conditions in the manufacturing plant 5. The manufacturing plant 5 finds appropriate molding conditions while changing various parameters in accordance with the input manufacturing conditions.

When the actual production result acquired by the combination of the first injection molding machine and the first mold exists, the actual production result acquisition unit 33 outputs the actual production result acquired from the actual production result storage unit 32 to the manufacture execution instruction unit 34. When the actual production result acquired by the first mold exists but the actual production result acquired by the combination of the first injection molding machine and the first mold does not exist, the actual production result acquisition unit 33 instructs the correction molding condition acquisition unit 35 to acquire the correction molding conditions.

The correction molding condition acquisition unit 35 has a function of acquiring the correction molding conditions by the combination of the first injection molding machine and the first mold specified by the manufacturing condition determination unit 31 from the molding condition correction system 4.

The correction molding condition acquisition unit 35 has a function of requesting the molding condition correction system 4 to generate the correction molding conditions, and acquiring the correction molding conditions generated by the molding condition correction system 4. The correction molding condition acquisition unit 35 acquires the correction molding conditions from the molding condition correction system 4 by transmitting basic information needed to generate the correction molding conditions to the molding condition correction system 4.

The basic information needed to generate the correction molding conditions includes the first injection molding machine and the first mold specified by the manufacturing condition determination unit 31, another injection molding machine (hereinafter referred to as a second injection molding machine) with which an actual production result has been acquired with the combination of the first mold, and the actual production result (second actual production result) acquired by the combination of the second injection molding machine and the first mold, for example.

When the correction molding condition acquisition unit 35 acquires the correction molding conditions from the molding condition correction system 4, the correction molding condition acquisition unit 35 outputs the acquired correction molding conditions to the manufacture execution instruction unit 34.

The manufacture execution instruction unit 34 has a function of instructing the manufacturing plant 5 to perform the manufacture execution. Note that the manufacture execution can be also referred to as the production. The manufacture execution instruction includes the molding condition setting request or the actual production result input by the actual production result acquisition unit 33, any one of the correction molding conditions acquired by the correction molding condition acquisition unit 35, and the manufacturing conditions specified by the manufacturing condition determination unit 31, for example.

The actual production result learning unit 36 has a function of recording the molding conditions with which the satisfactory molded article quality is confirmed to be acquired in the manufacturing plant 5 on the actual production result storage unit 32. The actual production result learning unit 36 registers the molding conditions with which a quality that is equal to or higher than a predetermined standard is acquired with the actual production result storage unit 32 on the basis of information indicating the quality result of the molded article acquired from a quality inspection unit 53 of the manufacturing plant 5.

The molding condition correction system 4 is described. The molding condition correction system 4 has a function of correcting the molding conditions on the basis of the actual production result input from the manufacture execution system 3 and the molding-machine-unique information acquired in advance. The corrected molding conditions are referred to as correction molding conditions.

The molding-machine-unique information in this embodiment is information unique to every injection molding machine, and includes the machine difference unique to the injection molding machine in addition to the model number and the specifications of the injection molding machine.

The machine difference in this embodiment is the difference between the input molding conditions and the physical amount at the predetermined position in the mold when the same molding conditions are input to a plurality of injection molding machines.

The predetermined position in the mold is a resin inflow port in the mold, for example. The physical amount includes the pressure of the resin, the temperature of the resin, the speed of the resin, the material property of the resin, and the displacement amount of the mold (mold displacement amount), for example. The material property is the density of the resin, the viscosity of the resin, and the distribution of the fiber length of the resin (for a case of a material containing reinforcement fiber), for example. The machine difference is conceived to be generated due to the difference in the control algorithm (a control mode and a configuration value) of the pressure control, the temperature control, or the like, and the difference in auxiliary equipment such as a mold temperature adjusting machine (not shown), for example, in addition to the difference in the configuration of an injection molding machine 50 described below in FIG. 3.

The molding condition correction system 4 is described. The molding condition correction system 4 includes a molding-machine-unique information storage unit 41, a molding-machine-unique information acquisition unit 42, a molding condition correction unit 43, and a molding-machine-unique information learning unit 44, for example.

The molding-machine-unique information storage unit 41 has a function of storing the molding-machine-unique information acquired in advance for the injection molding machines therein.

The molding-machine-unique information acquisition unit 42 has a function of acquiring the molding-machine-unique information and the like of the injection molding machine specified by the manufacture execution system 3 from the molding-machine-unique information storage unit 41. The molding-machine-unique information acquisition unit 42 acquires the molding-machine-unique information (first molding-machine-unique information) of the first injection molding machine and the molding-machine-unique information (second molding-machine-unique information) of the second injection molding machine from the correction molding condition acquisition unit 35 of the manufacture execution system 3, and outputs the acquired molding-machine-unique information to the molding condition correction unit 43. The molding-machine-unique information acquisition unit 42 can also receive the actual production result acquired by the actual production result acquisition unit 33 from the actual production result storage unit 32 via the correction molding condition acquisition unit 35, and give the received actual production result to the molding condition correction unit 43.

The molding condition correction unit 43 has a function of correcting the molding conditions on the basis of the information input from the molding-machine-unique information acquisition unit 42. The molding condition correction unit 43 has a function of generating the correction molding conditions by correcting the molding conditions on the basis of the first molding-machine-unique information and the second molding-machine-unique information input from the molding-machine-unique information acquisition unit 42, and the actual production result acquired by the combination of the second injection molding machine and the first mold. The molding condition correction unit 43 transmits the generated correction molding conditions to the correction molding condition acquisition unit 35 of the manufacture execution system 3.

The molding-machine-unique information learning unit 44 has a function of extracting the feature amount of the physical amount on the basis of data (sensing data) from a sensor 57 provided in the injection molding machine 50 or the mold, and storing the feature amount into the molding-machine-unique information storage unit 41 as the machine difference information. In other words, the molding-machine-unique information learning unit 44 extracts the feature amount from the sensing data in injection molding processes 54 to 56 acquired from the manufacturing plant 5, and stores the extracted feature amount in the molding-machine-unique information storage unit 41 as the machine difference information.

The manufacturing plant 5 is described. The manufacturing plant 5 receives the manufacture execution instruction from the manufacture execution system 3, and executes one or a plurality of the injection molding processes 54 to 56. In FIG. 1, the injection molding may be abbreviated to "IM".

The manufacturing plant 5 includes a manufacture execution unit 51, a plurality of the injection molding machines 50 (described below in FIG. 3), a plurality of molds (described below in FIG. 3), a molding condition generating unit 52, and a molded article quality inspection unit 53, for example. The molded article quality inspection unit 53 may be hereinafter abbreviated to the quality inspection unit 53.

The manufacture execution unit 51 executes the injection molding process on the basis of the manufacturing conditions input from the manufacture execution instruction unit 34 of the manufacture execution system 3. When the correction molding conditions are input, the manufacture execution unit 51 executes the injection molding process 54 by inputting the correction molding conditions for the combination of the injection molding machine and the mold instructed in the manufacturing conditions. In other words, the injection molding process 54 is a process of performing the injection molding on the basis of the correction molding condition.

When the actual production result is input, the manufacture execution unit 51 executes the injection molding process 55 by inputting the actual production result for the instructed combination of the injection molding machine and the mold. In other words, the injection molding process 55 is an injection molding process performed with the molding conditions with which results of producing a non-defective product have been acquired with use of the specified combination of the injection molding machine and the mold.

When the molding condition setting request is input, the manufacture execution unit 51 outputs an instruction for setting the molding conditions to the molding condition generating unit 52. When the molding condition generating unit 52 receives the molding condition setting request from the manufacture execution unit 51, the molding condition generating unit 52 derives an optimal molding conditions with which non-defective products can be stably acquired. The time for setting the molding conditions can be reduced by analyzing the flow of the resin in advance and finding rough molding conditions when the molding conditions are derived. When it can be confirmed that non-defective products can be stably acquired in accordance with the derived molding conditions in the quality inspection unit 53, the derived optimal molding conditions are input and the injection molding process 56 is executed. In other words, the injection molding process 56 is a process of deriving the molding conditions and performing the injection molding in accordance with the derived molding conditions.

The quality inspection unit 53 has a function of determining whether the quality of the molded article acquired in the injection molding process is high. The molded article quality is evaluated on the basis of size, a warp amount, a burr, damage, luster, and color, for example. The quality inspection of the molded article may be automatically performed, manually performed by an inspector, or semi-automatically performed.

When the quality of the molded article is satisfactory, the quality inspection unit 53 outputs the manufacturing conditions, the combination of the injection molding machine and the mold, the molding conditions, and the inspection result of the molded article quality to the actual production result learning unit 36 of the manufacture execution system 3.

Note that the molding-machine-unique information according to this embodiment is acquired by measuring the physical amount at a predetermined position in the mold by the sensors 57 mounted on the injection molding machines and the molds provided in the manufacturing plant 5 in advance and outputting the physical amount to the molding condition correction system 4.

Figure 2:
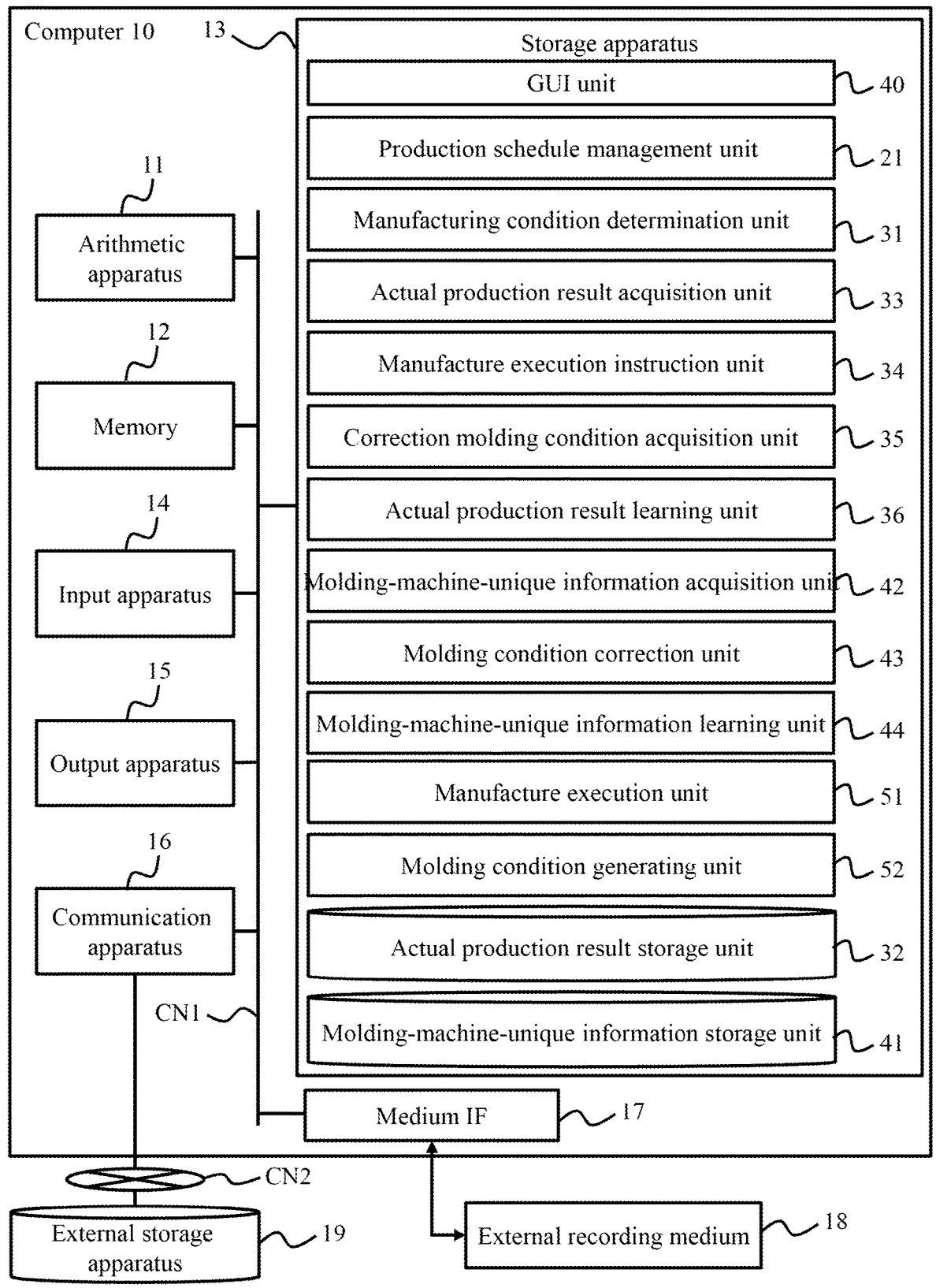
FIG. 2 is an explanatory diagram illustrating a hardware configuration and a software configuration of a computer that can be used to implement the injection molding system.

FIG. 2 illustrates a configuration example of a computer 10 that can be used to implement the injection molding system 1 of this embodiment. A case where the injection molding system 1 is implemented by one computer 10 is described here, but the present invention is not limited thereto. One or a plurality of the injection molding systems 1 can be constructed by linking a plurality of computers. As described above, the production management system 2, the manufacture execution system 3, and the manufacturing plant 5 can also implement the injection molding system 1 when the operator performs some or all of the functions without using dedicated software and hardware.

As in other embodiments described below, the molding condition correction system 4 can be constructed as software that functions on a cloud server, and can be shared among a plurality of users. In this case, the molding-machine-unique information recorded on the molding-machine-unique information storage unit 41 can be shared among the plurality of users. In this case, when the number of the users increases, the number of cases where the correction molding conditions can be acquired with use of the molding-machine-unique information acquired by another user increases, and hence the working hours for acquiring the molding-machine-unique information can be reduced.

The computer 10 includes an arithmetic apparatus 11, a memory 12, a storage apparatus 13, an input apparatus 14, an output apparatus 15, a communication apparatus 16, and a medium interface unit 17, for example, and those elements apparatuses 11 to 17 are coupled to each other by a communication path CN1. The communication path CN1 is an internal bus, a LAN (Local Area Network), and the like.

The arithmetic apparatus 11 is formed by a microprocessor, for example. The arithmetic apparatus 11 implements the functions 21, 31 to 36, 41 to 44, 51, 52, and 60 serving as the injection molding system 1 by reading computer programs stored in the storage apparatus 13 to the memory 12 and executing the computer programs.

The storage apparatus 13 is an apparatus that stores the computer programs and data therein, and has a rewritable storage medium such as a flash memory or a hard disk drive. In the storage apparatus 13, a computer program for implementing a GUI unit 40 that provides a GUI (Graphical User Interface) to the operator, and computer programs for implementing the abovementioned functions 21, 31 to 36, 41 to 43, 51, and 52 are stored.

The input apparatus 14 is an apparatus with which the operator inputs information to the computer 10. Examples of the input apparatus 14 include pointing devices such as a keyboard, a touch panel, and a mouse, and a voice instruction apparatus (none shown). The output apparatus 15 is an apparatus from which the computer 10 outputs information. Examples of the output apparatus 15 include a display, a printer, and a voice synthesis apparatus (none shown).

The communication apparatus 16 is an apparatus that causes external information processing apparatuses and the computer 10 to communicate with each other via a communication network CN2. The external information processing apparatuses include an external storage apparatus 19 besides a computer (not shown). The computer 10 can read the data (the molding-machine-unique information, the actual production result, and the like) and the computer programs stored in the external storage apparatus 19. The computer 10 can store all or a part of the computer programs and the data stored in the storage apparatus 13 by transmitting all or a part of the computer programs and the data to the external storage apparatus 19.

The medium interface unit 17 is an apparatus that performs reading and writing from and to an external recording medium 18. Examples of the external recording medium 18 include a USB (Universal Serial Bus) memory, a memory card, and a hard disk drive. The computer programs and the data can be transferred from the external recording medium 18 to the storage apparatus 13, and all or a part of the computer programs and the data stored in the storage apparatus 13 can be transferred to and stored in the external recording medium 18.

Figure 3:
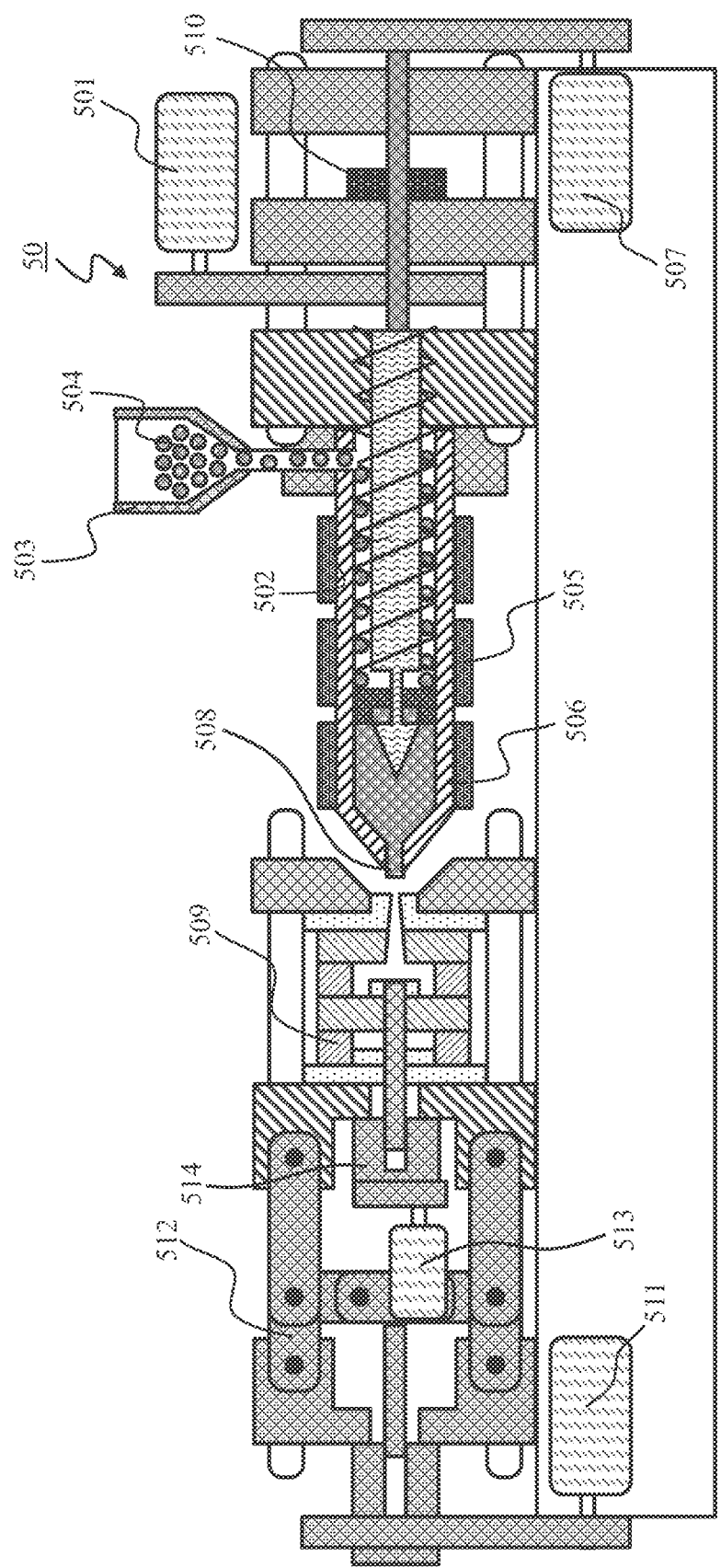
FIG. 3 is a cross-sectional view illustrating the configuration of an injection molding machine.

FIG. 3 illustrates the outline of the injection molding machine 50. Stages of the injection molding process are described with reference to FIG. 3. In this embodiment, the molding phenomenon means a series of phenomena that occur in the injection molding process. In this embodiment, the injection molding process is roughly classified into a measurement and plasticization stage, an injection and pressure maintenance stage, a cooling stage, and a removal stage.

In the measurement and plasticization stage, a screw 502 is retracted by the driving force of a motor 501 for plasticization, and resin pellets 504 are supplied into a cylinder 506 from a hopper 503. Then, by the heating of heaters 505 and the rotation of the screw 502, the resin is plasticized so that a uniform molten state is acquired. The density of the molten resin and the breakage degree of the reinforcement fiber change in accordance with the back pressure of the screw 502 and the configuration of the rotation speed. Those changes affect the molded article quality.

In the injection and pressure maintenance stage, the screw 502 is advanced by the driving force of a motor 507 for injection, and the molten resin is injected into a mold 509 via a nozzle 508. The cooling from the wall surface of the mold 509 and shear heating due to the flow concurrently affect the molten resin injected into the mold 509. In other words, the molten resin flows into the cavity of the mold 509 while receiving the cooling effect and the heating effect.

After the molten resin fills up the mold 509, the molten resin is supplied to the mold 509 by the amount of the volume shrinkage in accordance with the cooling of the molten resin while applying the maintaining pressure. When the mold clamping force that is a force for closing the mold 509 is small with respect to the pressure during the injection and the pressure during the maintaining pressure, a slight mold displacement is generated after the solidification of the molten resin, and the molded article quality is affected by the slight gap.

In the cooling stage, the molten resin is cooled to a solidification temperature or less by the mold 509 maintained at a constant temperature. The residual stress generated in the cooling stage affects the quality of the molded article. The residual stress is generated in accordance with the anisotropy of the material property generated by the flow in the mold, the density distribution in accordance with the maintaining pressure, and the unevenness of the molding shrinkage degree.

In the removal stage, the mold 509 is opened by driving a mold clamping mechanism 512 by the driving force of a motor 511 that opens and closes the mold 509. Then, by driving an ejector mechanism 514 by the driving force of a motor 513 for protrusion, the solidified molded article is removed from the mold 509. Then, the mold 509 is closed for the next shot. When sufficient protrusion force has not been uniformly applied to the molded article when the molded article is removed from the mold 509, residual stress remains in the molded article, which affects the quality of the molded article.

In the injection molding machine 50, the pressure is controlled so that the pressure value in accordance with a load cell 510 approaches the pressure value in the input molding conditions. The temperature of the cylinder 505 is controlled by a plurality of the heaters 506. Different pressure losses occur for the injection molding machines in accordance with the shape of the screw 502, the shape of the cylinder 505, and the shape of the nozzle 508. As a result, the pressure at the resin inflow port in the mold 509 becomes a value that is lower than the pressure indicated by the molding conditions input to the injection molding machine. The resin temperature at the resin inflow port in the mold 509 may be different from the resin temperature indicated in the molding conditions input to the injection molding machine due to the arrangement of the heaters 506 and the shear heating of the resin at the nozzle portion. The configuration of the injection mechanism (the shape of the screw 502, the shape of the cylinder 505, the shape of the nozzle 508, the arrangement of the heaters 506, and the like) differs depending on the injection molding machine. Therefore, even when different injection molding machines are used, the same molded article quality can be acquired by correcting the molding conditions so that the physical amount of the molten resin at the resin inflow port in the mold 509 becomes the same.

The quality of the molded article is evaluated by the shape properties (weight, length, thickness, sink marks, a burr, a warp, and the like), the surface properties such as appearance defects (weld, silver streaks, burn, whitening, damage, bubbles, delamination, flow marks, jetting, color and luster, and the like), and mechanical and optical properties (tensile strength, impact resistance, and the like).

The shape properties have a strong correlation with the history of the pressure and the temperature and the mold clamping force in the injection and pressure maintenance stage and the cooling stage. The occurrence factors of the surface properties differ depending on the occurring phenomenon, but the flow mark and the jetting have a strong correlation with the temperature and the speed of the resin in the injection stage, for example. Regarding the mechanical and optical properties, for example, the tensile strength needs evaluation in a breakage test, and hence is evaluated with other correlating quality indicators such as weight.

In the molding conditions, parameters corresponding to the stages in the injection molding process are configured. For the measurement and plasticization stage, the measurement position, the suck back, the back pressure, the back pressure speed, the rotation speed, and the like are configured. For the injection and pressure maintenance stage, the pressure, the temperature, the time, and the speed are configured. For the injection and pressure maintenance stage, the screw position (VP switching position) at which the injection and the pressure maintenance are switched, and the mold clamping force of the mold 509 are also configured. For the cooling stage, the cooling time after the pressure maintenance is configured. As parameters relating to temperature, the temperature of the plurality of heaters 506, the temperature and the flow rate of a refrigerant for cooling the mold 509, and the like are configured.

Figure 4:
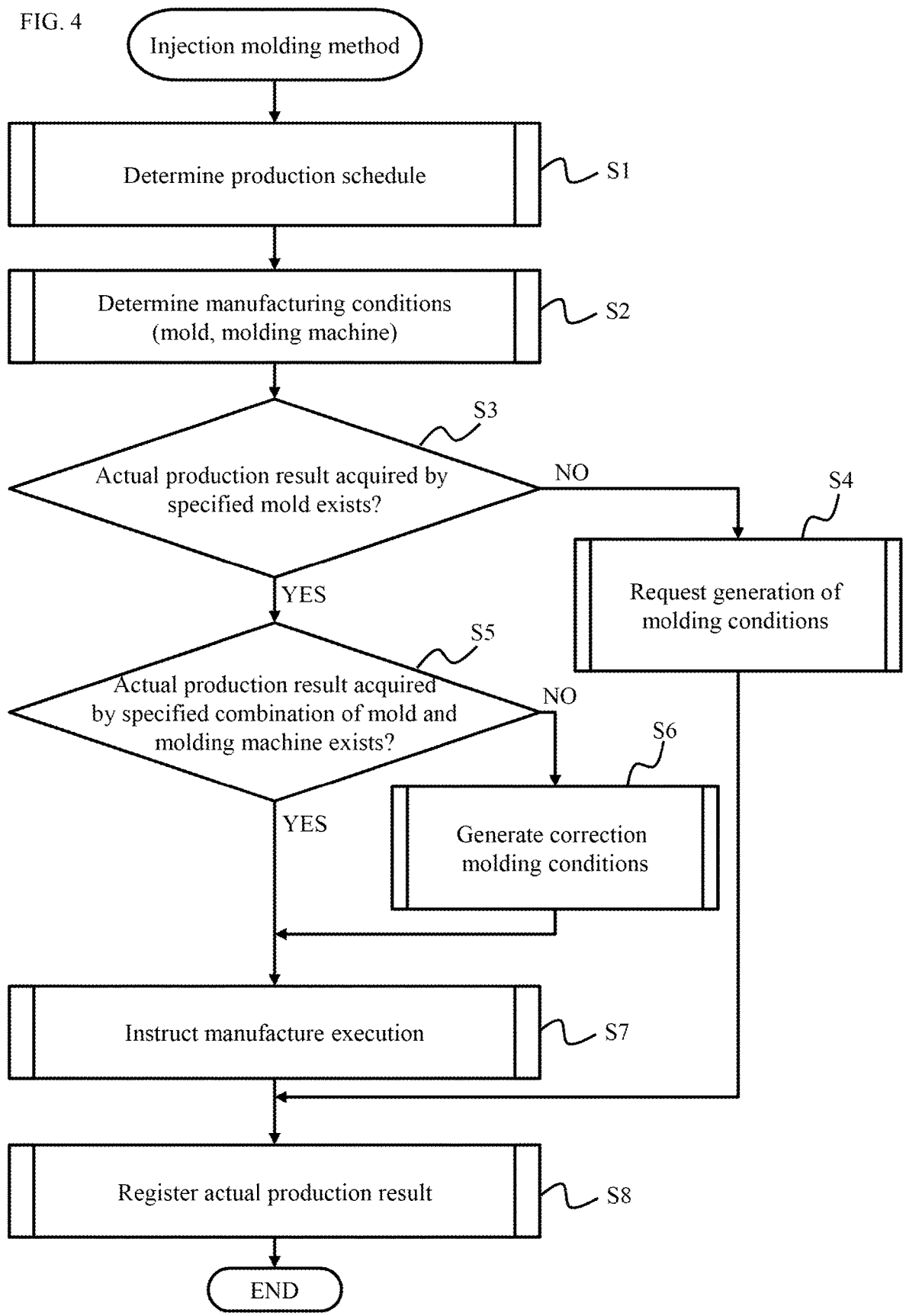
FIG. 4 is a flowchart illustrating an injection molding method.

FIG. 4 illustrates a flowchart of an example of an injection molding method performed by the injection molding system 1. In the drawings, the injection molding machine is abbreviated to a molding machine. In FIG. 4, the first mold referred to as a specified mold, and the first injection molding machine is referred to as a specified molding machine.

The production management system 2 acquires an order status and a stock status that are information for specifying the production schedule from the production schedule management unit 21 implemented by the GUI unit 40 (S1). For example, the operator generates the production schedule by specifying the optimal production specifications, quantity, and period from the order status and the stock status displayed on the GUI (S1). Alternatively, the production schedule can be automatically generated by introducing a mathematical schedule model and an algorithm for optimizing the logistics as a whole.

The manufacture execution system 3 acquires the production schedule from the manufacturing condition determination unit 31 implemented by the GUI unit 40, and determines the manufacturing conditions (S2). For example, the operator determines the optimal combination of the first injection molding machine and the first mold and the like from the production schedule and the operation status of the injection molding machine in the manufacturing plant 5. Alternatively, the manufacturing conditions can also be automatically specified by introducing a mathematical schedule model and an algorithm for optimizing the production efficiency.

The actual production result acquisition unit 33 determines whether an actual production result exists by referring to the actual production result acquired by the first mold specified in Step S2 that is recorded on the actual production result storage unit 32 (S3). When the actual production result acquired by the first mold does not exist (S3: NO), the actual production result acquisition unit 33 outputs a molding condition setting request to the manufacture execution instruction unit 34 (S4). When the actual production result acquired by the first mold exists (S3: YES), the processing proceeds to Step S5.

When the molding condition setting request is input from the actual production result acquisition unit 33, the manufacture execution instruction unit 34 instructs the manufacturing plant 5 to set the molding conditions (S4). For example, in the molding condition generating unit 52, the operator checks the instruction for setting the molding conditions from the manufacture execution unit 51 implemented by the GUI unit 40. Then, the operator derives the optimal molding conditions with which non-defective products can be stably acquired by performing the injection molding process by the combination of the first injection molding machine and the first mold (S4) Note that the number of repetitions of the injection molding process (the number of trials and errors) in the molding condition setting can be reduced by theoretically deriving the optimal molding conditions in advance by the resin flow analysis in Step S4.

The actual production result acquisition unit 33 determines whether an actual production result exists by referring to the actual production result acquired by the combination of the first injection molding machine and the first mold specified in Step S2 that are recorded on the actual production result storage unit 32 (S5). When the actual production result acquired by the combination of the first injection molding machine and the first mold exists (S5: YES), the actual production result acquisition unit 33 outputs the acquired actual production result to the manufacture execution instruction unit 34 (S7). When the actual production result acquired by the combination of the first injection molding machine and the first mold does not exist (S5: NO), the actual production result acquisition unit 33 instructs the correction molding condition acquisition unit 35 to acquire the correction molding conditions (S5).

The correction molding condition acquisition unit 35 inputs the first injection molding machine, the first mold, the second injection molding machine with which an actual production result has been acquired by the combination with the first mold, and the actual production result acquired by the combination of the second injection molding machine and the first mold specified by the manufacturing condition determination unit 31 to the molding condition correction system 4, to thereby cause the correction molding conditions to be generated (S6). The correction molding condition acquisition unit 35 outputs the generated correction molding conditions to the manufacture execution instruction unit 34 (S6).

The manufacture execution system 3 outputs the manufacture execution instruction including the manufacturing conditions specified in Step S2 and the actual production result input in Step S5 or the correction molding conditions input in Step S6 from the manufacture execution instruction unit 34 implemented by the GUI unit 40 to the manufacturing plant 5 (S7).

For example, the operator can check the manufacturing conditions and the actual production result or the correction molding conditions that are specified, and provide the manufacture execution instruction to the manufacturing plant 5 when no problem is found in the contents. Alternatively, the molding conditions of which machine differences are corrected can be provided even when the operator does not check the contents of the actual production result or the correction molding conditions that are specified.

The operator checks the contents of the manufacture execution instruction via the manufacture execution unit 51 implemented by the GUI unit 40, and executes the injection molding process by the instructed combination of the injection molding machine, the mold, and the molding conditions (S7).

When the molded article quality acquired by the injection molding process performed in Step S4 or Step S7 is satisfactory, the molded article quality inspection unit 53 registers the manufacturing conditions, the combination of the injection molding machine and the mold, the molding conditions, and the inspection result of the molded article quality, for example, with the actual production result learning unit 36 (S8). The GUI unit 40 can be used in the information registration with the actual production result learning unit 36. As a result, when the same combination of the injection molding machine and the mold is specified as a manufacturing condition from next time, manufacture can be performed on the basis of the actual production result stored in the actual production result storage unit 32.

Figure 5:
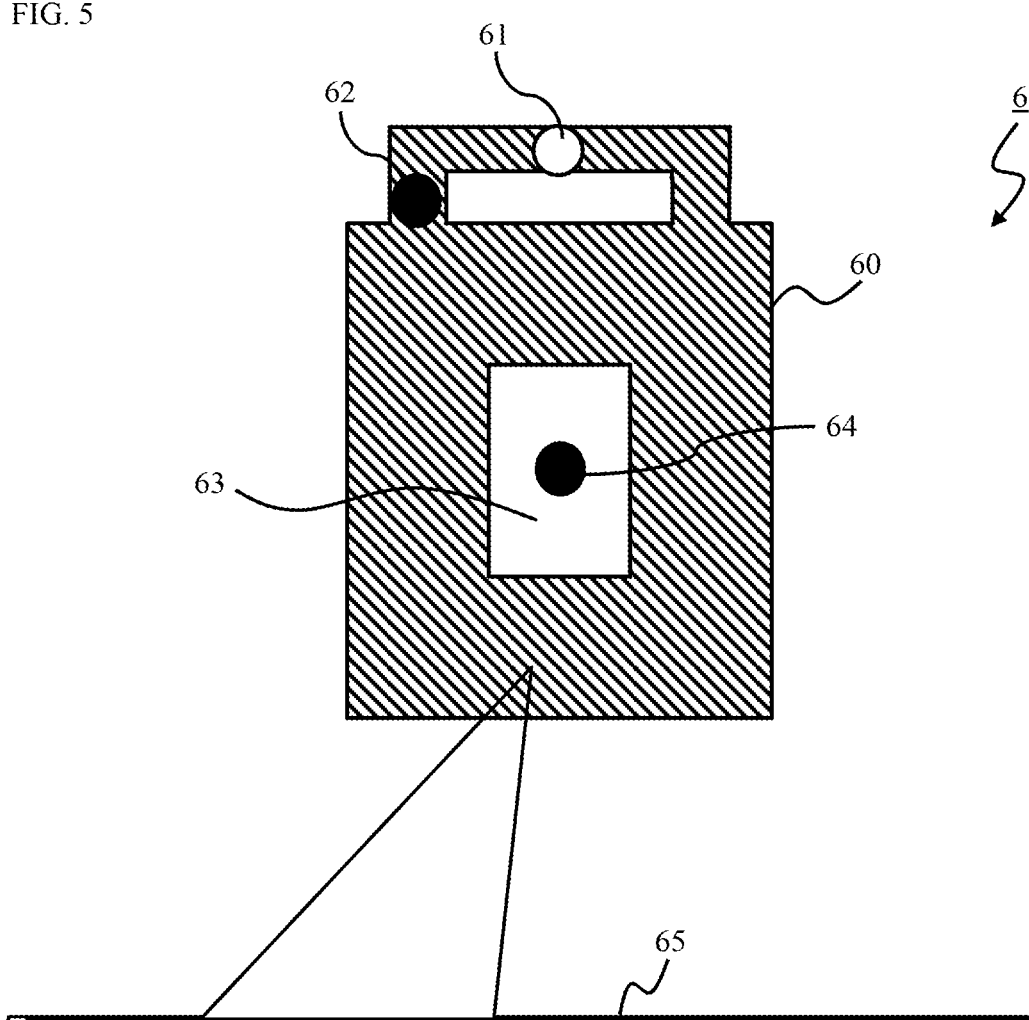
FIG. 5 is an explanatory diagram illustrating the outline of an experiment for checking the effect of an embodiment of the present invention.

FIG. 5 illustrates an outline of an experiment example 6 that tests the effect of this embodiment. The experiment state is illustrated on the upper side of FIG. 5. A table 65 of the experiment result is shown on the lower side of FIG. 5. The table 65 includes some input values of the molding conditions and the evaluation results in a test experiment.

The mold structure 60 illustrated on the upper side of FIG. 5 is a structure in which the resin flows into the cavity from a sprue 61 by a two-point side-gate method. In the actual molding experiment, a pressure sensor and a resin temperature sensor (neither shown) were disposed in a sensor disposing portion 62 of the runner. A mold position sensor (not shown) was disposed in a sensor disposing portion 64 in the central portion of a cavity 63.

In the experiment example 6, the time variation of the pressure and the temperature in the cavity 63 was acquired as the molding phenomenon. In the experiment example 6, the time variation of the mold displacement amount was acquired.

Out of the data acquired in the experiment example 6, a peak value (the peak pressure in the drawing) of the pressure sensor and a peak value (the peak resin temperature in the drawing) of the temperature sensor were acquired as the "feature amount". The weight of the acquired molded article was measured as an indicator of the molded article quality. Polypropylene was used as the material used in the molding. As the injection molding machines, an electric injection molding machine (hereinafter referred to as a molding machine IMB) of which maximum mold clamping force was 55 t and screw diameter was 25 mm, and an electric injection molding machine (hereinafter referred to as a molding machine IMA) of which maximum mold clamping force was 50 t and screw diameter was 26 mm were used.

Experiments were performed for a total of three cases, that is, cases where the same molding conditions were input to the molding machine IMA and the molding machine IMB, and a case where correction molding conditions for the molding machine IMB were generated on the basis of the molding-machine-unique information acquired in advance and input to the molding machine IMB.

Note that the diameter of the screw 602 in the molding machine IMA and the screw diameter in the molding machine IMB were different, and hence the injection speeds were input by being converted so that the injection rates become the same (While the injection speed of the molding machine IMA was 32.4 mm/s, the injection speed of the molding machine IMB was set to 30 mm/s. The injection rate became 17.2 cm$^3$/s for both cases). Parameters relating to the measurement/plasticization stage were similarly converted and input.

With reference to the table 65 shown on the lower side of FIG. 5, case where the same molding conditions were input for the molding machine IMA and the molding machine IMB were compared with each other. The peak pressure and the peak resin temperature were lower in the molding machine IMB. Meanwhile, when the correction molding conditions were input to the molding machine IMA, the differences in the peak pressure and the peak resin temperature were almost gone between the molding machine IMA after the correction and the molding machine IMB as shown on the right side of the table 65. Accordingly, the weight error of the molded articles acquired by the molding machine IMA and the molding machine IMB improved by 0.65% after the correction. The above was a result acquired by inputting the correction molding conditions of which maintaining pressure and resin temperature were corrected on the basis of the molding-machine-unique information acquired in advance to the injection molding machine IMA.

Figure 6:
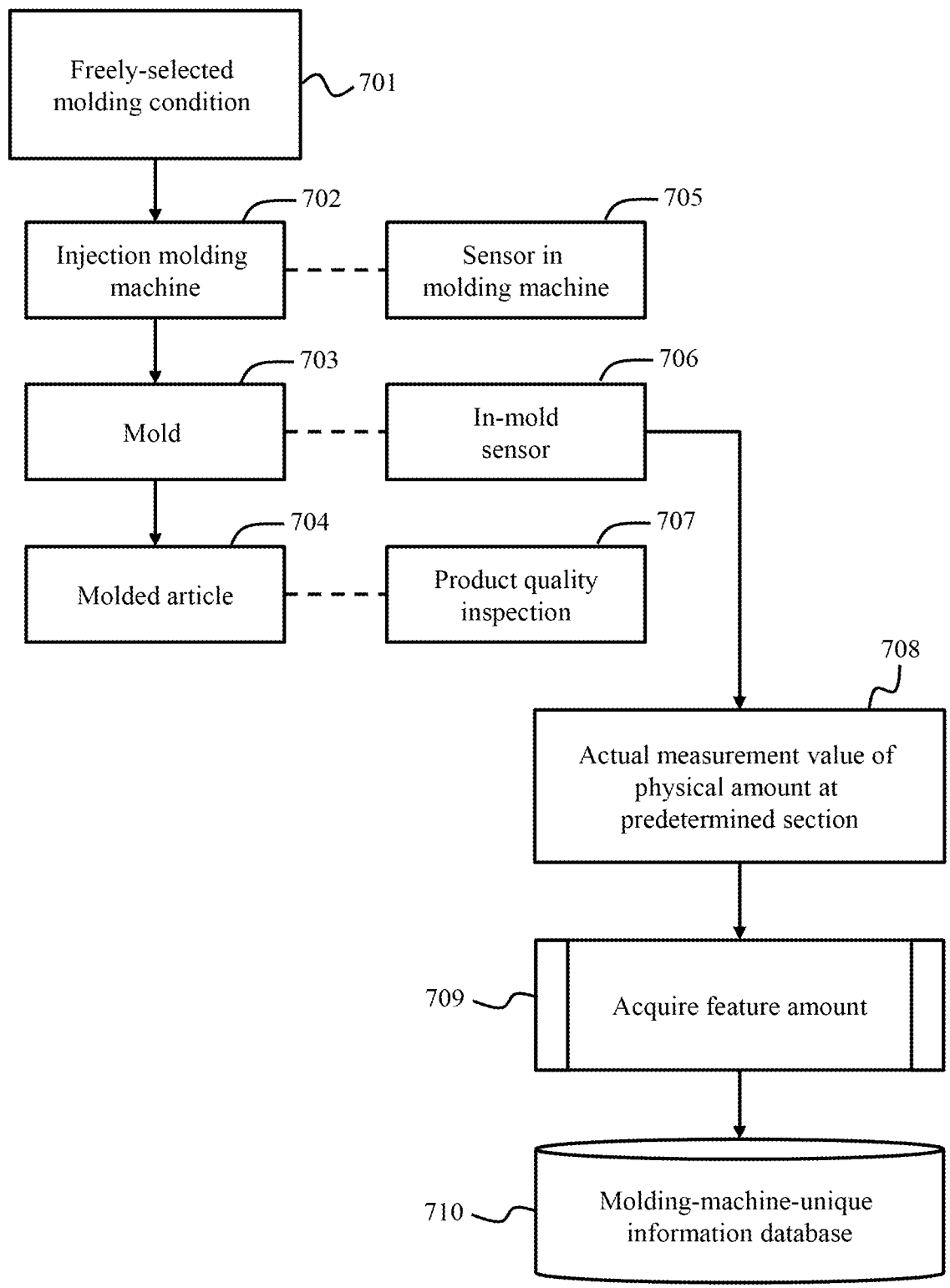
FIG. 6 is a block diagram illustrating a method of acquiring molding-machine-unique information.

FIG. 6 is a block diagram illustrating an example of a method of acquiring the molding-machine-unique information of the injection molding machine. The acquisition method of the molding-machine-unique information illustrated in FIG. 6 is implemented by using a "mold with a sensor" or a "mold with a built-in sensor" in which a sensor that measures a predetermined physical amount at a predetermined position is provided as also described with reference to FIG. 5.

First, by inputting a freely-selected molding condition 701 to an actual injection molding machine 702, a physical amount in a predetermined section in the mold is acquired. The injection molding machine 702 corresponds to the injection molding machine 50 described with reference to FIG. 3.

The molding condition 701 does not necessarily need to be a single condition and may be a plurality of conditions. The physical amount can be acquired with various molding conditions as long as non-defective products can be acquired regarding the molded article quality.

The machine difference of the injection molding machine may differ depending on the configuration values of the resin temperature or the maintaining pressure, and hence may not be effective when acquired in a single molding condition. The molding condition 701 is preferred to be a condition with which the pressure maintenance is completed after the gate seal. This is because there is a fear that the resin may flow back from a gate portion and that the filling density of the molded article may decrease when the pressure maintenance time is insufficient and the pressure maintenance is completed before the gate seal. In this case, the evaluation of the correlation with the molded article quality is difficult.

There is a method that uses a sensor 705 in a molding machine or an in-mold sensor 706 in order to acquire the molding phenomenon in the actual injection molding machine 702. An example of the sensor 705 in the molding machine is the load cell 510 illustrated in FIG. 3.

When the sensor 705 in the molding machine is used, the pressure loss by the injection mechanism is indirectly measured by performing an air shot that performs injection without mounting a mold 703 and observing the output of the load cell 510 at that time, for example. Alternatively, a sensor is installed at the nozzle portion, and the state of the resin shortly before flowing into the mold is measured. When the resin temperature is measured, the temperature of the resin acquired by the air shot can be directly measured by a thermometer and the like.

When the in-mold sensor 706 is used, an actual measurement value 708 of the physical amount can be acquired by directly measuring the molding phenomenon in the mold 703 by disposing a sensor in a freely-selected position in the mold 703. Note that the quality of a molded article 704 can be acquired by product quality inspection 707.

The feature amount is acquired from the acquired physical amount (709). Each acquired physical amount is acquired as the time variation in the injection molding process, and hence it is difficult to directly evaluate the physical amount. Thus, in this embodiment, the machine difference of the injection molding machine 702 can be quantitatively evaluated by acquiring the feature amount that may affect the molded article quality from the time variation of the physical amount.

In this embodiment, the acquired feature amount and the freely-selected molding condition that is input first are associated with each other, and are recorded on a molding-machine-unique information database 710. The molding-machine-unique information database 710 corresponds to the molding-machine-unique information storage unit 41 in FIG. 1.

Figure 7:
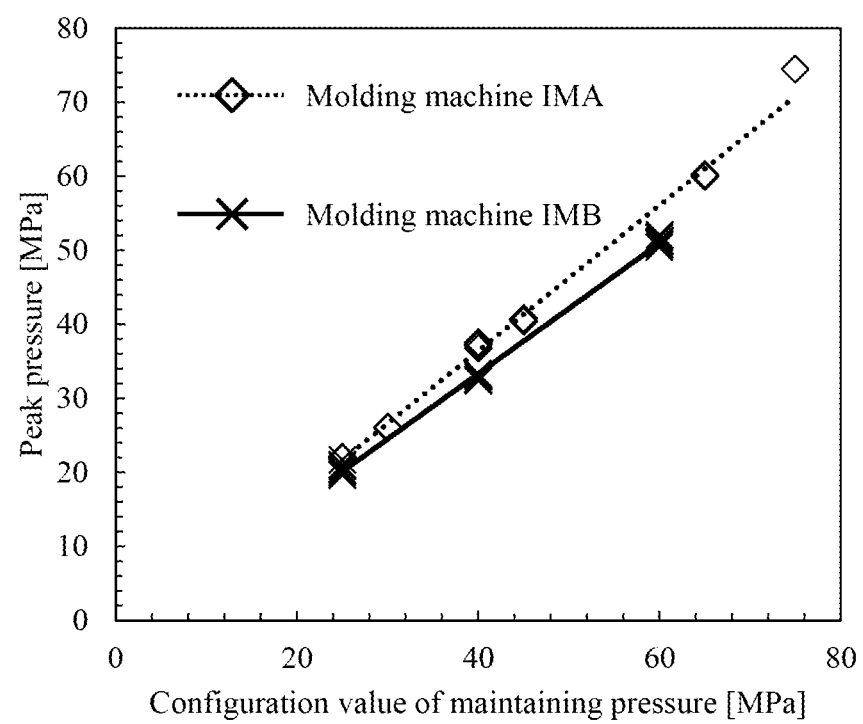
FIG. 7 is a graph showing how the relationship between configuration values of the maintaining pressure and the peak pressure differ for each molding machine.
Figure 8:
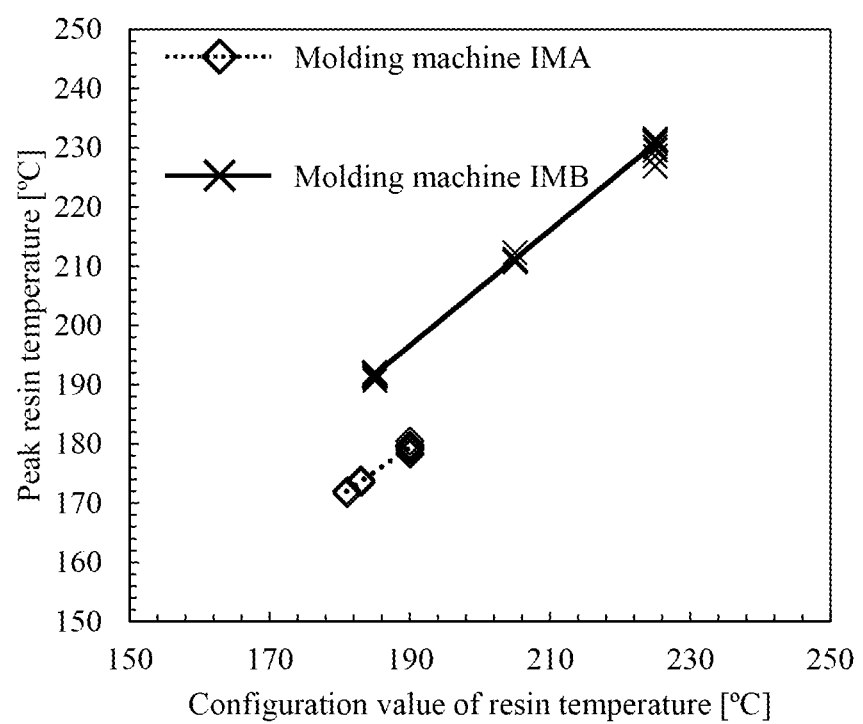
FIG. 8 is a graph showing how the relationship between the resin temperature and the peak resin temperature differ for each molding machine.

Measurement results of the experiment example described with reference to FIG. 5 are described with reference to FIG. 7, FIG. 8, FIG. 9, and FIG. 10. FIG. 7 and FIG. 8 are measurement results in the mold structure 60 when the actual measurement values of the physical amounts are acquired with use of the in-mold sensor 706.

As described above, in this experiment, the peak value of the pressure sensor and the peak value of the resin temperature sensor in the sensor disposing portion 62 of the runner were acquired. The "molding machine IMA" indicated by rhombus measurement points is an injection molding machine of which maximum mold clamping force is 50 t and screw diameter is 26 mm described above. The "molding machine IMB" indicated by x-mark measurement points is an injection molding machine of which maximum mold clamping force is 55 t and screw diameter is 25 mm described above. The experiment was performed for a plurality of maintaining pressures and input values of the resin temperature.

FIG. 7 shows peak pressures of the pressure sensors with respect to configuration values of the maintaining pressures. As illustrated in FIG. 7, by the pressure loss by the injection mechanism, values of the peak pressures became smaller than the configuration values of the maintaining pressures. In the two molding machines IMA and IMB, inclinations of the configuration values of the maintaining pressures and the peak pressures that were acquired were different. Therefore, it is preferred that acquisition of the machine difference in pressure be attempted with a plurality of molding conditions.

FIG. 8 shows peak temperatures of the resin temperature sensors with respect to configuration values of the resin temperatures. As shown in FIG. 8, the values of the peak temperatures with respect to the configuration values differed between the molding machine IMA and the molding machine IMB due to the difference in the injection mechanisms. As described above, the machine difference at places near the mold inflow ports can be directly evaluated by acquiring the actual measurement values of the physical amounts with use of the in-mold sensor 706. As a result, the feature amount of the physical amount necessary in order to derive the correction molding conditions can be accurately acquired.

Figure 9:
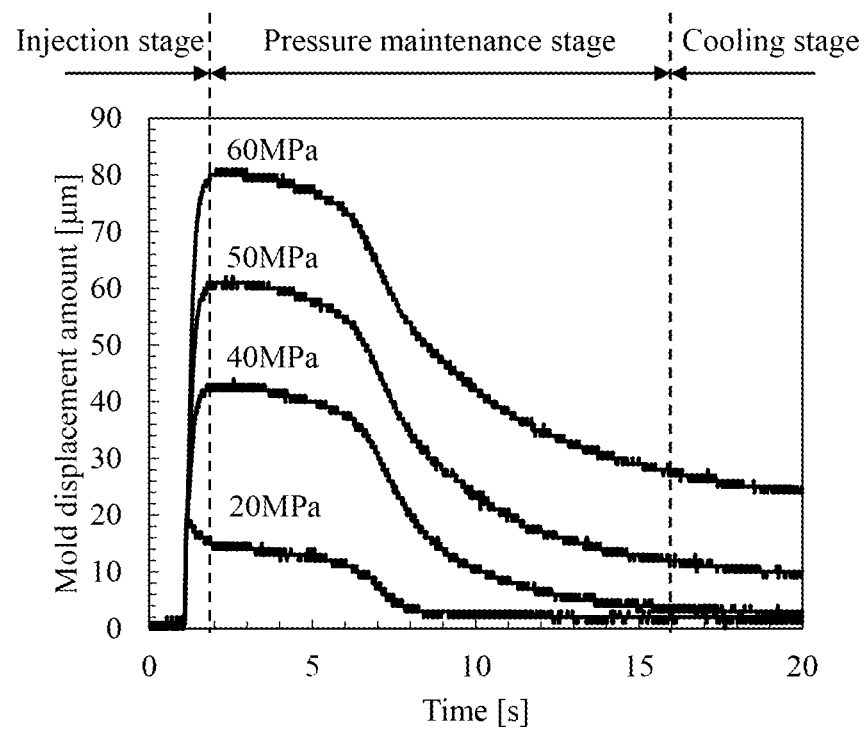
FIG. 9 is a graph showing the time variation of a displacement amount of a mold.
Figure 10:
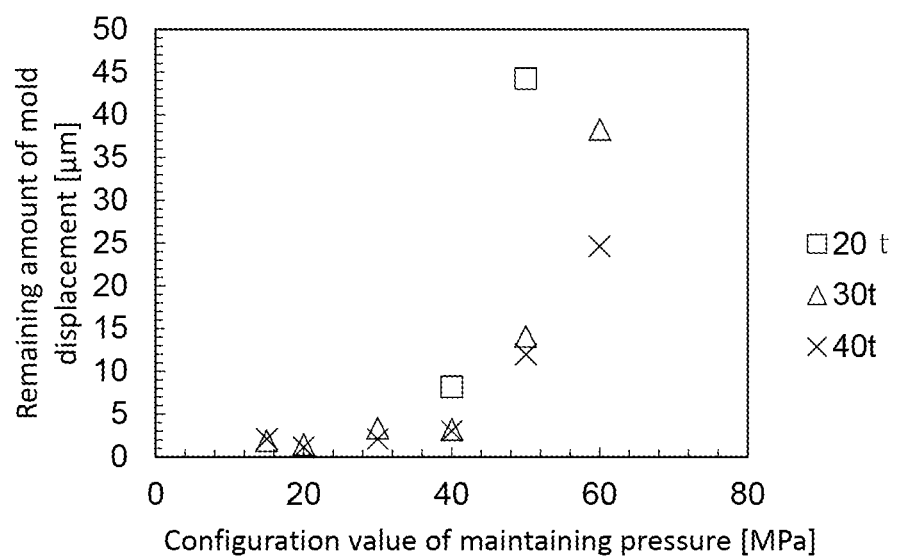
FIG. 10 is a graph showing the relationship between the configuration value of the maintaining pressure and the remaining amount of the displacement amount of the mold.

FIG. 9 and FIG. 10 are graphs showing how the actual mold clamping force is insufficient even when the calculated necessary mold clamping force is configured according to the molding conditions. The mold shape 60, or the mold structure 60 used in the experiment is as that illustrated in FIG. 5. As illustrated in FIG. 5, the mold position sensor (not shown) that can measure the time variation of a minute mold displacement amount in the injection molding process was provided in the sensor disposing portion 64 of the mold 60, and molding was performed by measuring the mold clamping force as a parameter by the mold position sensor.

In FIG. 9, the projected area of the mold structure 60 is about 50 square centimeters. A necessary mold clamping force F at this time is acquired by Expression 1 below.

$$F=PA \qquad \text{(Expression 1)}$$

Here, "F" represents the necessary mold clamping force, "P" represents the pressure in the cavity, and "A" represents the projected area. As the pressure in the cavity, the higher value out of the injection pressure of the input molding conditions and the pressure in the pressure maintenance stage is used. Alternatively, the pressure actually applied in the cavity is used in consideration of the pressure loss in the injection molding machine, the sprue in the mold, and the pressure loss of a runner portion. For example, values acquired by measuring the pressure in the cavity may be used as shown in FIG. 7.

The necessary mold clamping force calculated in accordance with Expression 1 is 30 t when the pressure is maintained at 60 MPa. Therefore, the molding quality is not affected with the conditions shown in FIG. 9. However, when the maintaining pressure is at 50 MPa or more, the mold displacement amount did not return to its original position even in the cooling stage, and about 10 µm to 30 µm remained. In this case, the molded article quality is affected, for example, a burr is generated in the molded article or the weight becomes excessively heavy.

FIG. 9 shows measurement values of the mold displacement amount when the mold clamping force is 40 t and the maintaining pressure is changed within the range of from 20 MPa to 60 MPa. As shown in FIG. 9, the mold displacement amount reaches a peak in the injection stage. Then, the mold gradually returns to its original position in the pressure maintenance stage. The mold displacement amount is originally conceived to return to its original position in the cooling stage when the mold clamping force is sufficient.

FIG. 10 shows the remaining amount of the mold displacement in the cooling stage when the maintaining pressure is changed where the mold clamping force is from 20 t to 40 t. As shown in FIG. 10, it can be understood that the remaining amount of the mold displacement differs depending on the mold clamping force. For example, when the pressure is maintained at 40 MPa, the mold displacement slightly remained when the mold clamping force was 20 t.

As described above, there are machine differences for each injection molding machine, and hence there is a fear that high quality cannot be maintained only by configuring the calculated necessary mold clamping force in the molding conditions. This is because there is a fear that the mold clamping force may become insufficient and a burr and the like may be generated in reality.

Thus, in this embodiment, the correction molding conditions with which the molded article quality can be ensured can be selected by experimentally acquiring an effective mold clamping force unique to the injection molding machine with which molding can be performed without the mold clamping force being insufficient with respect to a configuration value of the mold clamping force of the injection molding machine in advance.

A method of deriving the effective mold clamping force unique to the injection molding machine is described. As shown in the example in FIG. 7, threshold values of the mold clamping force and the in-mold pressure are derived from output values of the mold position sensor provided on a division plane of the mold 60.

The injection molding is performed by using the pressure in the injection and pressure maintenance stage as a parameter, and the time variation of the mold displacement amount is recorded. As shown in FIG. 9 and FIG. 10, in the cooling stage for the mold, the remaining mold displacement amount is recorded.

The necessary mold clamping force (the force applied in the mold) with respect to the configuration value of the maintaining pressure is calculated on the basis of Expression 1. At this time, a minimum value of the maintaining pressure at which the remaining amount of the mold displacement decreases to an amount that does not affect the molded article quality is acquired. The force applied in the mold at the minimum value of the maintaining pressure is recorded on the molding-machine-unique information database 710 as an effective mold clamping force unique to the injection molding machine.

At this time, the relationship of the effective mold clamping force with the configuration value of the mold clamping force is acquired by performing molding while changing the value of the mold clamping force, as appropriate. As a result, a mold clamping force with which a molded article quality that is more stable than that of the related art can be acquired can be configured in consideration of the minute amount of the mold displacement that affects the molded article quality.

The force applied in the mold with respect to the configuration value of the maintaining pressure can be calculated from Expression 1 with use of the configuration value of the maintaining pressure. The force applied in the mold with respect to the configuration value of the maintaining pressure can also be calculated from Expression 2 below by predicting the pressure applied to the mold by a flow analysis.

$$F=\Sigma P_i A_i \qquad \text{(Expression 2)}$$

The suffix (variable) of a summation symbol Z is "i". Here, "i" represents the number of segments acquired by dividing the total projected area in the analysis model. In addition, "Pi" represents an average pressure of the segments. Further, "Ai" represents an area of each segment.

In the molding for acquiring an effective mold clamping force, a maximum value of the pressure may be actually acquired by introducing a pressure sensor in the mold. As a result, the necessary mold clamping force can be calculated from Expression 1 in consideration of the pressure actually applied to the mold. As a result, the effective mold clamping force unique to the injection molding machine can be accurately configured even when Expression 1 is used.

An in-mold section (hereinafter referred to as a measurement section) at which the physical amount other than the mold displacement amount is measured is described. In every mold structure, the measurement section is preferred to at least include a sprue portion or a runner portion from the resin inflow port in the mold to the inside of the cavity.

The inside of the cavity may be the measurement section, but a pressure loss from the resin inflow port to the cavity needs to be considered when the molding-machine-unique information is derived with the abovementioned procedure. Therefore, the analysis accuracy from the resin inflow port to the inside of the cavity needs to be guaranteed.

When measurement is performed by providing a sensor in the cavity, there is a fear that a mark due to the shape of the sensor may remain in the molded article. Therefore, a restriction in which the sensor cannot be introduced in a place of which appearance quality is requested arises.

Thus, in this embodiment, the molding-machine-unique information can be acquired conveniently and with high accuracy by setting the sprue portion or the runner portion, which is close to the resin inflow port and of which appearance quality is not requested, to be the measurement section.

In addition to the sprue portion and the runner portion, sections in which characteristic flows may be observed such as a flow distal-end portion, a resin merging portion (welding portion), and a portion directly under the gate in the cavity may be used as the measurement sections. In this case, molding-machine-unique information with a higher accuracy can be acquired from the physical amount acquired by a plurality of sensors.

For example, the flow velocity of the molten resin can be acquired from the passage time point of the flow front at the plurality of measurement sections, and hence the molding-machine-unique information relating to the speed of the molten resin can be derived. By measuring the pressure and the temperature at this time, the viscosity of the molten resin in the mold can be estimated and compared with an analysis model.

Note that the appropriate measurement sections differ depending on the mold structure and the physical amount to be measured. Regarding the physical amount other than the mold displacement amount, the sprue portion is preferred to be the measurement section for any mold structure if possible. Note that the expression of "preferred" in this specification is merely used as the meaning of being able to expect some sort of advantageous effect, and does not mean that the configuration is essential.

When it is difficult to provide a sensor in the sprue portion in terms of mold design, the sensor only needs to be disposed in the runner portion. In the case of a direct gate, the runner portion does not exist, and hence a section that is as close as possible to the gate from the cavity is selected as the measurement section.

In a side gate, a jump gate, a submarine gate, and a banana gate, the sensor is disposed on a runner portion directly under a sprue portion, a runner portion immediately before a gate, and the like. In the case of a pin gate, ingenuity is required in order to dispose the sensor because the structure is a three-plate structure, but the sensor is disposed on a runner portion directly under a sprue portion, for example. In the case of the pin gate, a dummy runner that is not coupled to the cavity may be provided for measurement and used as the measurement section. By providing a section dedicated to measurement, the flexibility in the mold design improves. In the case of a film gate and a fan gate, the sensor is disposed on a runner portion before the flow-in to the gate portion.

Note that the measurement of the mold displacement amount is preferred to be performed at a position close to the central portion of the cavity surface of the mold as illustrated in the disposing position 64 of the mold position sensor in FIG. 5, for example. In a mold having an ejector mechanism, the mold displacement amount tends to be larger in a central portion as compared to a peripheral portion that directly receives the mold clamping force from the molding machine because the central portion is affected by the flexure of the mold due to the pressure of the resin.

Parameters measured as the physical amount are described. In this embodiment, in order to derive the correction molding conditions, the mold displacement amount, the pressure, and the temperature are at least measured. In the measurement of the mold displacement amount, the pressure, and the temperature, a mold position sensor, an in-mold pressure sensor, a mold surface temperature sensor, a resin temperature sensor, and the like can be used. For the resin temperature sensor, one or both of a contact-type temperature sensor such as a thermocouple and a non-contact-type temperature sensor such as an infrared radiation thermometer can be used.

Regarding the physical amount of each of the mold displacement amount, the pressure, and the temperature, the time variation during the injection molding process is recorded. When the mold displacement amount is not measured, there is a fear that the mold clamping force may become insufficient due to the machine difference unique to the injection molding machine and the molding phenomenon and the molded article quality may be affected. Even when the correction molding conditions are derived by using one of the pressure and the temperature as the evaluation standard, there are concerns that the molded article qualities of the acquired molded articles become different when both parameters are different from the configuration values as in FIG. 8. Therefore, the correction molding conditions can be acquired with high accuracy by measuring at least the mold displacement amount, the pressure, and the temperature.

The injection molding system 1 may acquire a flow front speed and a flow front passage time point in addition to the mold displacement amount, the temperature, and the pressure. From a sensor that detects the speed of the flow front and the passage of the flow front, information on the flow front passage time point can be acquired instead of the time variation during the injection molding process. When the flow front passage time point is acquired, at least two or more sensors are provided, and the passage time points of the resin between two points are compared with each other. By detecting the speed of the flow front and the passage time point, the injection speed can be evaluated in a more accurate manner.

The feature amount of the physical amount is described. In the derivation of the correction molding conditions of this embodiment, the mold displacement amount after the end of the cooling stage, the integral value and the maximum value of the pressure, and the maximum value of the temperature can be used, for example. The mold displacement amount after the end of the cooling stage is needed to configure a mold clamping force with which a minute amount of the mold displacement that affects the molded article quality is not generated. The maximum value of the pressure is needed in order to evaluate the pressure loss by the injection mechanism. However, when only the maximum values of the pressures are caused to match each other, the molded article quality may be affected when the time variations of the resin temperatures in the pressure maintenance stage are different from each other because the pressure distributions in the cavity change. Thus, by acquiring the integral value of the pressure during the injection molding process, the correction molding conditions can be derived with high accuracy in consideration of the influence of the temperature change during the process.

The molding phenomenon and the molded article quality may be affected when the correction molding conditions are derived with use of only the feature amount acquired from the pressure, for example, when the correction molding conditions are derived by changing the resin temperature and the like. Therefore, correction molding conditions with which a satisfactory molded article quality can be acquired can be derived by acquiring the molding-machine-unique information in consideration of the maximum value of the temperature in addition to the feature amount acquired from the pressure.

In addition to the above, it is also effective to acquire the maximum value of the time derivative value with respect to the time variation of the pressure. This feature amount has a correlation with the instantaneous viscosity of the material. The integral value of the pressure may be calculated by separating the calculation to the injection stage and the pressure maintenance stage. The integral value of the pressure in the injection stage has a correlation with the average viscosity of the material in the injection stage.

When an infrared-radiation-type resin temperature sensor is used, the maximum value of the time derivative value may be acquired with respect to the output value of the time variation of the temperature sensor in the injection stage. The feature amount has a correlation with the flow front speed of the molten resin. When the flow front speed is measured, the flow front speed is directly used as the feature amount that correlates with the flow speed. When the flow front passage time point is acquired, the flow velocity is calculated from the passage time points between two points as the feature amount. By recording the relationship of the flow velocity with the configuration value of the injection speed, the injection speed can be corrected in a more accurate manner.

Figure 11:
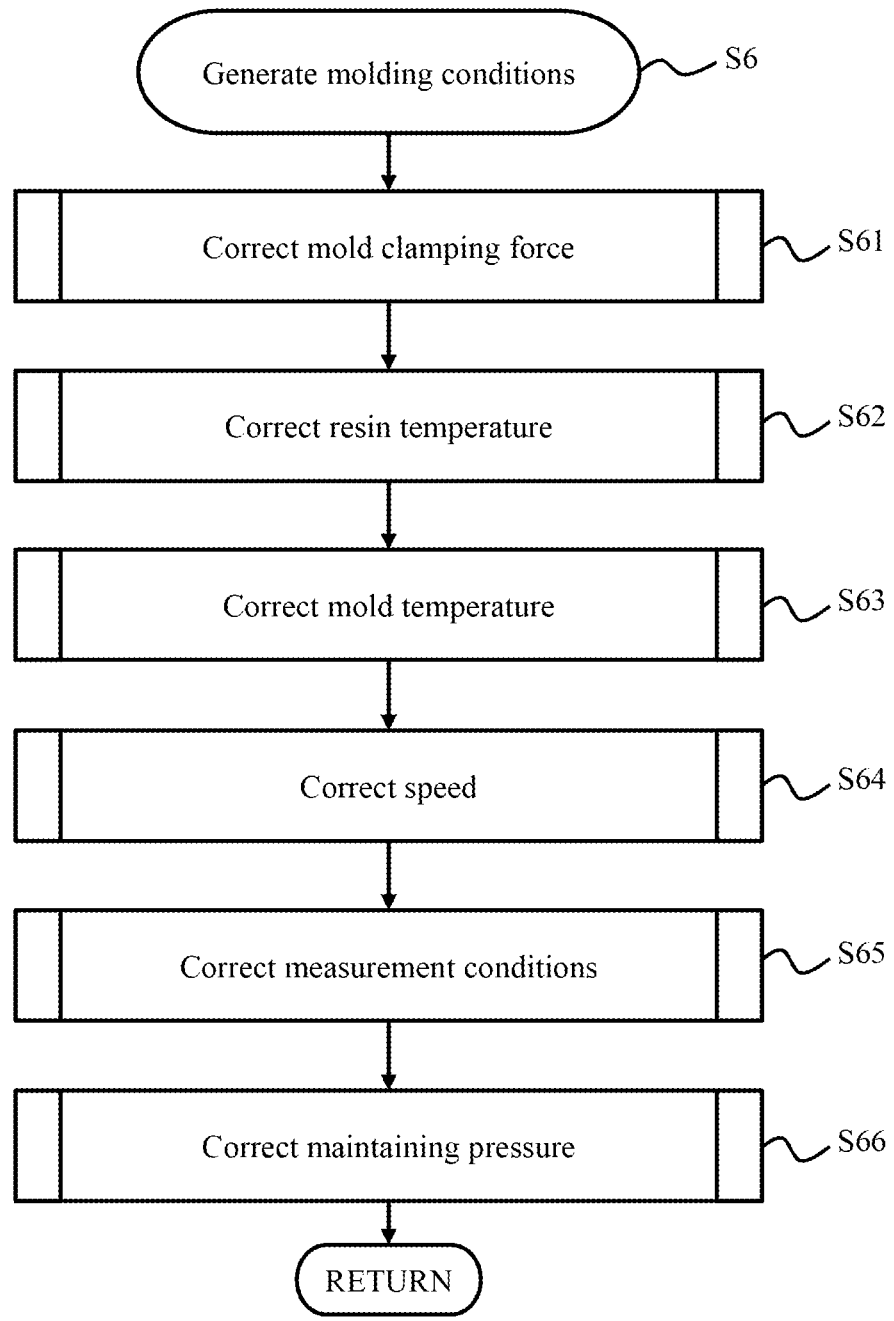
FIG. 11 is a flowchart illustrating processing for generating correction molding conditions.

With reference to FIG. 11 and FIG. 12, a method of generating the correction molding conditions is described. FIG. 11 is a flowchart illustrating details of Step S6 in FIG. 4. As described above, in Step S6, the molding condition correction unit 43 acquires the molding-machine-unique information of the first injection molding machine, the molding-machine-unique information of the second injection molding machine, and the actual production result acquired by the combination of the second injection molding machine and the first mold from the molding-machine-unique information acquisition unit 42, to thereby generate the correction molding conditions in accordance with the combination of the first injection molding machine and the first mold.

The molding condition correction unit 43 corrects the mold clamping force (S61). In Step S61, for example, the molding condition correction unit 43 refers to the configuration value of the mold clamping force of the second injection molding machine, and the effective mold clamping force of the second injection molding machine in accordance with the configuration value from the actual production result. In Step S61, the molding condition correction unit 43 further determines the configuration value of the mold clamping force of the first injection molding machine so that the effective mold clamping force of the first injection molding machine becomes equal to the effective mold clamping force of the second injection molding machine.

The molding condition correction unit 43 corrects the resin temperature (S62). In Step S62, as shown in FIG. 8, for example, the molding condition correction unit 43 refers to the configuration value of the resin temperature of the second injection molding machine, and the resin temperature at the mold inflow port of the second injection molding machine in accordance with the configuration value from the actual production result. In Step S62, the molding condition correction unit 43 further determines the configuration value of the resin temperature of the first injection molding machine so that the resin temperature at the mold inflow port of the first injection molding machine becomes equal to the resin temperature at the mold inflow port of the second injection molding machine.

The molding condition correction unit 43 corrects the mold temperature (S63). In Step S63, for example, the molding condition correction unit 43 refers to the configuration value of the refrigerant temperature and the configuration value of the flow rate in a mold temperature controlling machine that is accessorial with respect to the second injection molding machine, and the mold temperature at the mold inflow port of the second injection molding machine with respect to the configuration value from the actual production result. In Step S63, the molding condition correction unit 43 further determines the configuration value of the refrigerant temperature and the configuration value of the flow rate in the mold temperature adjusting machine that is accessorial with respect to the first injection molding machine so that the mold temperature at the mold inflow port of the first injection molding machine becomes equal to the mold temperature at the mold inflow port of the second injection molding machine.

The molding condition correction unit 43 corrects the injection speed and the pressure maintenance speed. In Step S64, Expression 3 to Expression 6, the speeds are corrected.

$$ATA=(\pi \times \varphi A \hat{~} 2)/4 \qquad \text{(Expression 3)}$$

$$ATA=(\pi \times \varphi B \hat{~} 2)/4 \qquad \text{(Expression 4)}$$

$$VIA=VIB \times ATB/ATA \qquad \text{(Expression 5)}$$

$$VHA=VHB \times ATB/ATA \qquad \text{(Expression 6)}$$

Here, "ATA" represents the cross-sectional area of the screw of the first injection molding machine. Further, "ATB" represents the cross-sectional area of the screw of the second injection molding machine. In addition, "φA" represents the diameter of the screw of the first injection molding machine. Further, "φB" represents the diameter of the screw of the second injection molding machine. In addition, "VIA" represents the injection speed of the first injection molding machine. Further, "VIB" represents the injection speed of the second injection molding machine. In addition, "VHA" represents the pressure maintenance speed of the first injection molding machine. Further, "VHB" represents the pressure maintenance speed of the second injection molding machine.

When a correlation in the configuration value of the speed and the actual measurement value of the speed is acquired between the first injection molding machine and the second injection molding machine, the configuration value of the speed is corrected so that the actual measurement values become equal in addition to the above in accordance with the abovementioned procedure.

The molding condition correction unit 43 corrects the measurement conditions (S65). In the measurement conditions, the measurement position, the VP switching position, and the screw rotation speed are included. In Step S65, correction is performed by Expression 7 to Expression 12 below.

$$ATA=(n\times\varphi A\textasciicircum 2)/4 \qquad \text{(Expression 7)}$$

$$ATA=(n\times\varphi B\textasciicircum 2)/4 \qquad \text{(Expression 8)}$$

$$DA=DB\times ATB/ATA \qquad \text{(Expression 9)}$$

$$DVP,A=DA+SA-(DB+SB-DVP,B)\times ATB/ATA \qquad \text{(Expression 10)}$$

$$DVP,A=DA+SA-(DB+SB-DVP,B)\times ATB/ATA \qquad \text{(Expression 11)}$$

$$nA=nB\times DB/DA \qquad \text{(Expression 12)}$$

Expressions 7 and 8 are similar to Expressions 3 and 4 above. Here, "DA" represents the measurement position of the first injection molding machine. Further, "DB" represents the measurement position of the second injection molding machine. In addition, "DVP,A" represents the VP switching position of the first injection molding machine. Further, "DVP,B" represents the VP switching position of the second injection molding machine. In addition, "SA" represents the suck back amount of the first injection molding machine. Further, "SB" represents the suck back amount of the second injection molding machine. In addition, "nA" represents the screw rotation speed of the first injection molding machine. Further, "nB" represents the screw rotation speed of the second injection molding machine.

The molding condition correction unit 43 corrects the maintaining pressure and the pressure maintenance time (S66). In Step S66, as shown in FIG. 8, for example, the molding condition correction unit 43 refers to the configuration value of the pressure of the second injection molding machine, and the pressure at the mold inflow port of the second injection molding machine in accordance with the configuration value. Next, the configuration value of the pressure of the first injection molding machine is specified so that the pressure at the mold inflow port of the first injection molding machine becomes equal to the pressure at the mold inflow port of the second injection molding machine.

By the procedure above, the correction molding conditions with which the same molded article quality can be acquired for the first injection molding machine and the second injection molding machine can be generated. For example, when the mold clamping force is not corrected, there is a fear that the mold clamping force may become insufficient and a burr and the like may be generated. When the pressure is corrected before the temperature, for example, the time variation of the pressure in the mold differs depending on the temperature, and hence accurate molding-machine-unique information cannot be acquired.

FIG. 12 is tables showing the correlation between the feature amounts of the physical amounts acquired from the in-mold sensor and the molding conditions for correction. In the tables in FIG. 12, notations are simplified as below. In other words, in the items in the lateral direction of table, the peak pressure is abbreviated to "Pmax", the peak mold temperature is abbreviated to "PTmmax", the peak resin temperature is abbreviated to "PTrmax", the maximum derivative value of the pressure is abbreviated to "diff Pmax", the maximum derivative value of the temperature is abbreviated to "diff Tmax", the integral value of the pressure in the injection step is abbreviated to "int P@I", and the integral value of the pressure in the pressure maintenance step is abbreviated to "int P@H". In the items in the vertical direction of the table, the pressure maintenance time is abbreviated to "Thp", the maintaining pressure is abbreviated to "HP", the injection speed is abbreviated to "IS", the VP switching position is abbreviated to "VP", the resin temperature is abbreviated to "Tr", and the mold temperature is abbreviated to "Tm".

In part (1) in FIG. 12, the feature amounts of the physical amounts are acquired by the in-mold sensor with various molding conditions in the mold structure 60. Part (1) in FIG. 12 shows the correlation between the molding conditions and the feature amounts.

As the feature amounts, the peak pressure, the peak mold temperature, the peak resin temperature, the maximum derivative value of the pressure, the maximum derivative value of the resin temperature, the pressure integral value in the injection step, and the pressure integral value in the pressure maintenance step are acquired. The item is indicated as "Low" when the correlation coefficient between the molding conditions and the feature amount is less than 0.3, "Middle" when the correlation coefficient is 0.3 or more and less than 0.7, and "High" when the correlation coefficient is 0.7 or more.

It can be understood that the feature amounts have a strong correlation with the plurality of molding conditions from part (1) in FIG. 12. Therefore, for example, when only the pressure is corrected by referring to the peak pressure, different molded article qualities are acquired if other molding conditions are not appropriately configured. As described above, the molding conditions have a correlation with each other, and hence it is difficult to specify all of the molding conditions at once.

In part (1) in FIG. 12, regarding the peak resin temperature, only the value corresponding to the resin temperature out of the correction molding conditions is "High", and the values of the other correction molding conditions are "Low". In other words, it can be understood that the peak resin temperature has a strong correlation with only the resin temperature. Thus, the resin temperature is specified so that the peak resin temperatures become equal first.

When the specified resin temperature is removed from the table, part (2) in FIG. 12 is acquired. As shown in part (2) in FIG. 12, the peak mold temperature has a strong correlation with only the mold temperature. Thus, the mold temperature is similarly specified so that the peak mold temperatures become equal.

When the specified mold temperature is removed from the table, part (3) in FIG. 12 is acquired. As shown in part (3) in FIG. 12, the maximum derivative value of the temperature has a strong correlation with only the injection speed. Thus, as with the above, the injection speed is specified so that the maximum derivative values of the temperature become equal.

When the specified injection speed is removed from the table, part (4) in FIG. 12 is acquired. As shown in part (4) in FIG. 12, the maximum derivative value of the pressure has a strong correlation with only the VP switching position. Thus, the VP switching position is specified so that the maximum derivative values of the pressure become equal.

When the specified VP switching position is removed from the table, part (5) in FIG. 12 is acquired. As shown in part (5) in FIG. 12, the pressure integral value in the injection step has a strong correlation with only the maintaining pressure. Thus, the maintaining pressure is specified so that the pressure integral values in the injection step become equal. The pressure maintenance time is specified so that the pressure integral values in the maintaining pressure step become equal.

As described above, by gradually specifying the molding conditions that can be uniquely determined by the above-mentioned procedure on the basis of the feature amounts of the physical amounts acquired from the in-mold sensor, the correction molding conditions can be acquired with the shortest procedure.

According to this embodiment configured as described above, when molding is performed in a certain injection molding machine with a mold with which actual production result has been acquired in another injection molding machine, the optimal injection molding conditions with which non-defective products can be acquired can be acquired in a shorter time than the related art without a skilled worker on the basis of the actual production result with which non-defective products can be acquired and the molding-machine-unique information acquired in advance.

According to this embodiment, when a production schedule is optimized as the manufacturing conditions, the combination of the injection molding machine and the mold does not necessarily need to be considered, and hence the production schedule can be planned in a more effective manner.

In this embodiment, by sharing the molding-machine-unique information acquired by a large number of users, the number of cases where the correction molding conditions can be acquired with use of the molding-machine-unique information acquired by another user increases as the number of the users increases. Therefore, working hours for acquiring the molding-machine-unique information can be significantly reduced.

Embodiment 2

Figure 13:
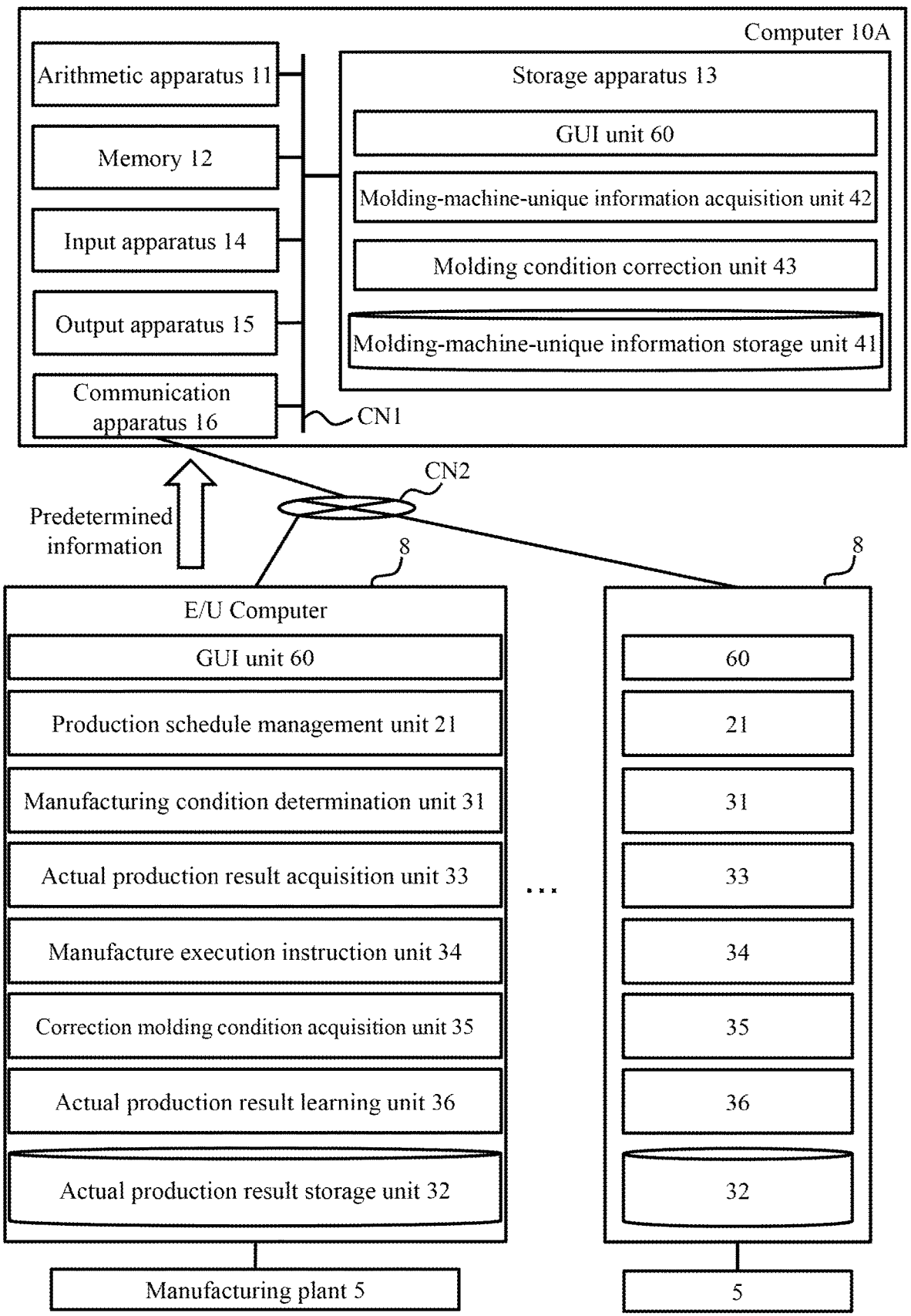
FIG. 13 is an explanatory diagram illustrating the computer configuration of an injection molding system according to Embodiment 2.

Embodiment 2 is described with reference to FIG. 13. In embodiments below including this embodiment, the differences from Embodiment 1 are mainly described. In this embodiment, the molding condition correction system 4 of the injection molding system 1 is provided in a computer 10A on the network CN2, and the production management system 2 and the manufacture execution system 3 are managed by a computer 8 on the user (E/U) side having the manufacturing plant 5. The computer 8 on the factory can acquire the correction molding conditions by transmitting predetermined information to the computer 10A on which the molding condition correction system 4 is implemented. As described above, examples of the predetermined information include information including the capacity of the first mold and the runner configuration of the first mold. For example, the control mode (PID (Proportional-Integral-Differential), the configuration value, and the like) of the first injection molding machine, the CAD (Computer Aided Design) data of the first mold, and the specification data and the configuration data of the first injection molding machine may also be employed as the predetermined information. The computer 8 on the factory side is one example of a "predetermined computer". The computer 10A is one example of "another predetermined computer".

This embodiment configured as described above also exhibits an effect similar to that of Embodiment 1. According to this embodiment, the computers 8 of the plurality of users can use the molding condition correction system 4 provided by the computer 10A in a sharing manner. Therefore, in this embodiment, by one molding condition correction system 4, the correction molding conditions can be provided for the injection molding machines in a plurality of factories.

Embodiment 3

Figure 14:
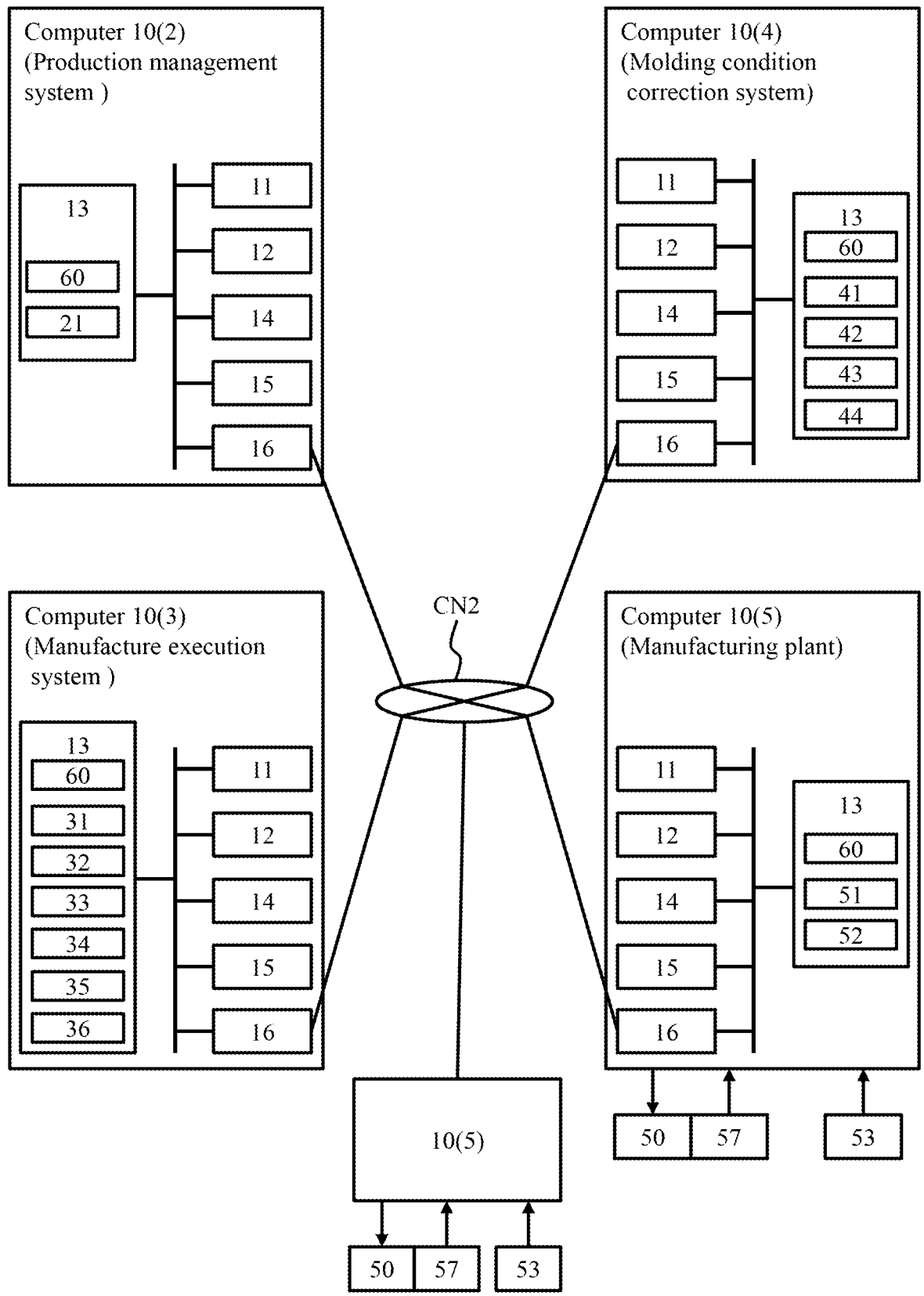
FIG. 14 is an explanatory diagram illustrating the computer configuration of an injection molding system according to Embodiment 3.

Embodiment 3 is described with reference to FIG. 14. In this embodiment, the production management system 2, the manufacture execution system 3, the molding condition correction system 4, and the manufacturing plant 5 described with reference to FIG. 1 are implemented by computers 10(2), 10(3), 10(4), and 10(5), and are coupled to each other by the communication network CN2.

This embodiment configured as described above also exhibits an effect similar to that of Embodiment 1. In this embodiment, the computers 10(2) to 10(5) are allocated to the systems 2 to 5. Therefore, for example, the computers 10(5) of the plurality of manufacturing plants that are dispersed can also be managed with use of the common production management system 2, manufacture execution system 3, and molding condition correction system 4.

Embodiment 4

Figure 15:
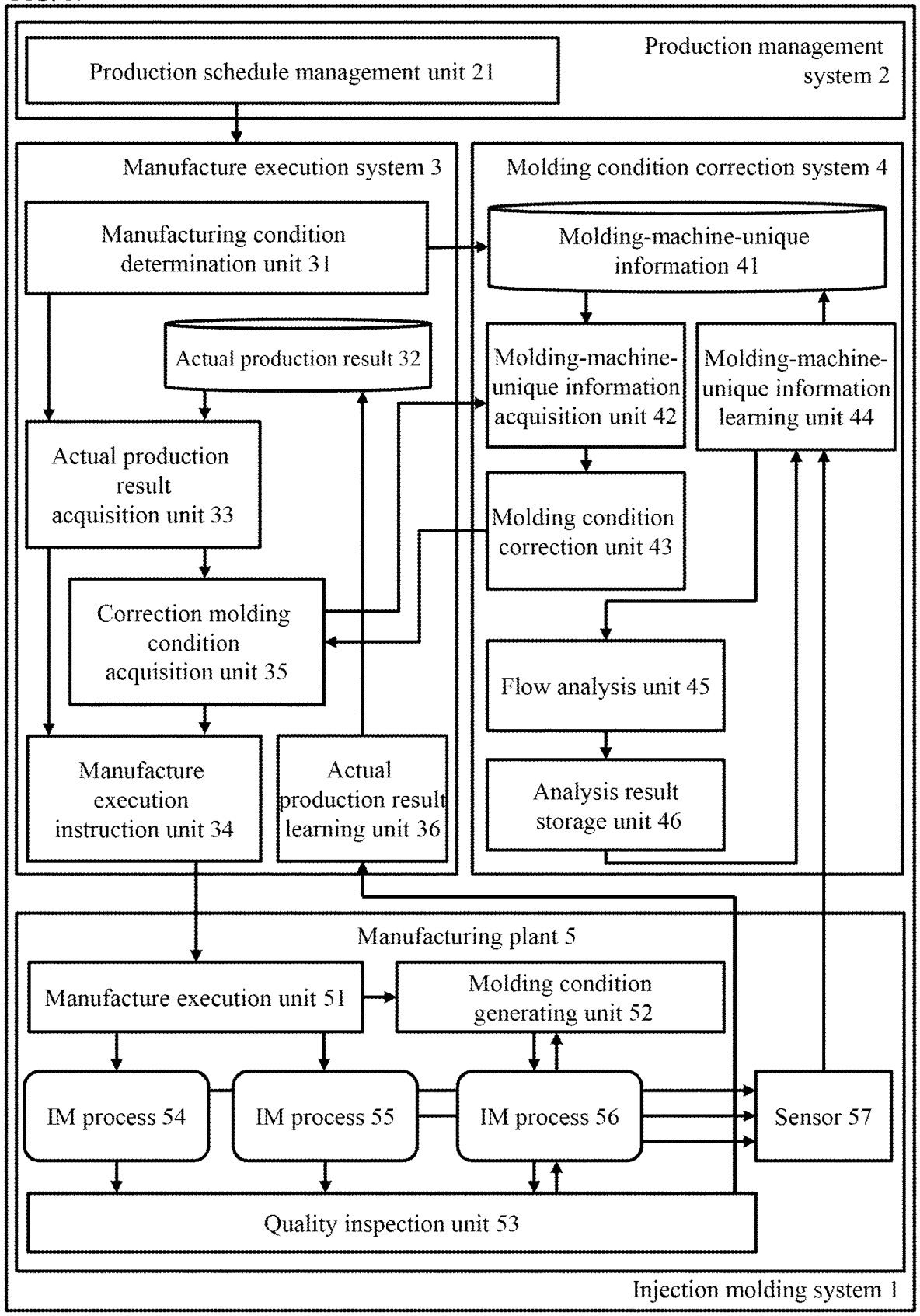
FIG. 15 is a functional block diagram of an injection molding system according to Embodiment 4.

Embodiment 4 is described with reference to FIG. 15 to FIG. 18. FIG. 15 is a functional block diagram of the injection molding system (or the injection molding method) 1 according to this embodiment. In this embodiment, the molding condition correction system 4 includes a flow analysis unit 45 and an analysis result storage unit 46 in addition to the functions 41 to 44 described above.

Figure 16:
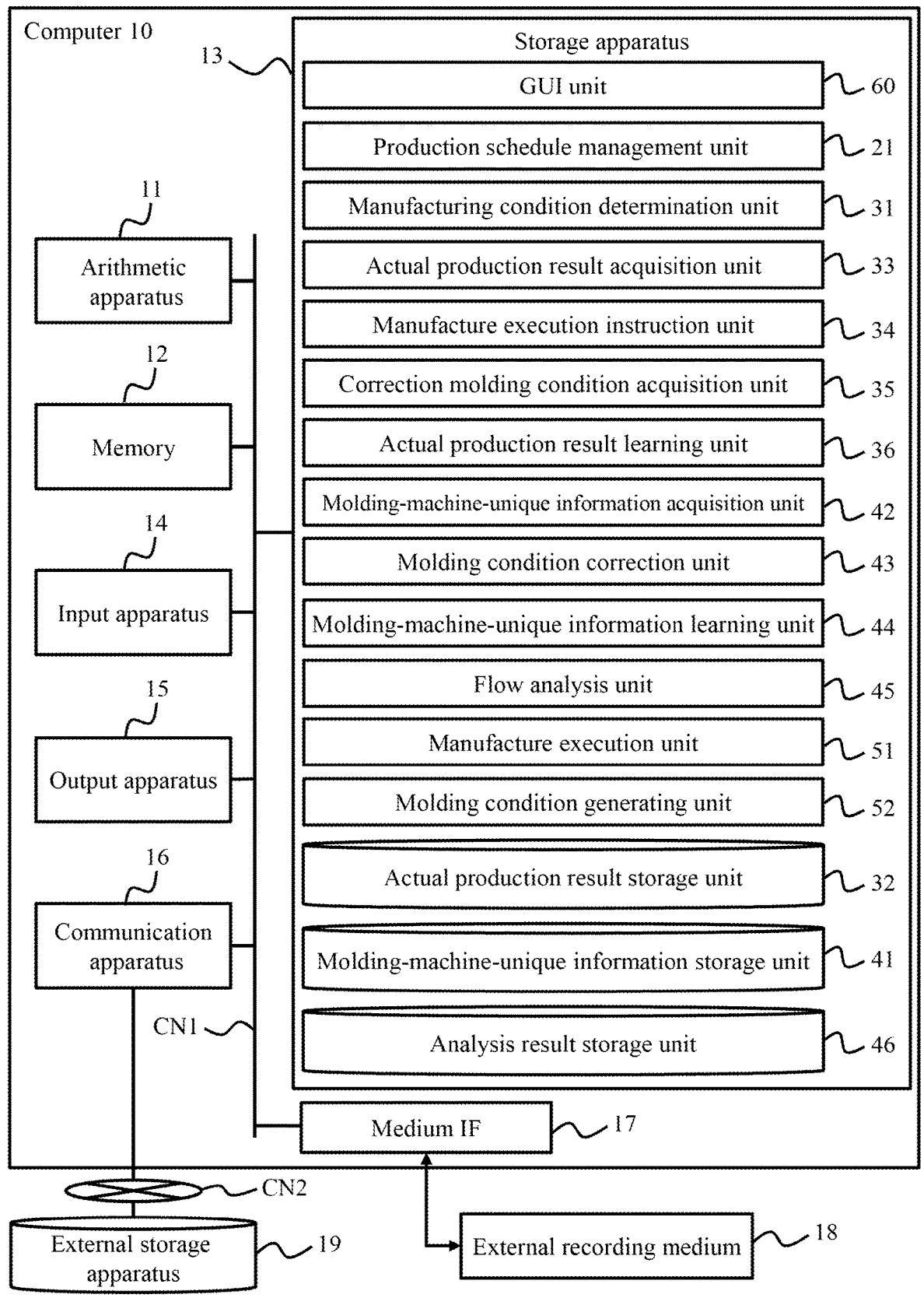
FIG. 16 is an explanatory diagram illustrating a hardware configuration and a software configuration of a computer that can be used to implement the injection molding system.

FIG. 16 illustrates a configuration example of the computer 10 that can be used to implement the injection molding system 1 of this embodiment. In the storage apparatus 13, computer programs for implementing the flow analysis unit 45 and the analysis result storage unit 46 are stored in addition to the computer programs for implementing the functions 21, 31 to 36, 41 to 44, 51, 52, and 60 described above.

In this embodiment, the molding-machine-unique information learning unit 44 extracts the feature amount of the actual measurement value of the physical amount on the basis of data (sensing data) from the sensor 57 provided on the injection molding machine 50 or the mold. The molding-machine-unique information learning unit 44 instructs the flow analysis unit 45 to execute the analysis, and extracts an analysis value of the feature amount of the physical amount on the basis of the analysis result recorded on the analysis result storage unit 46. The molding-machine-unique information learning unit 44 determines whether the actual measurement value of the feature amount and the analysis value match each other. When the values do not match each other, the molding-machine-unique information learning unit 44 generates injection point boundary conditions in which the analysis conditions are corrected, and instructs the flow analysis unit 45 to execute the analysis again. When the actual measurement value of the feature amount and the analysis value match each other, the molding-machine-unique information learning unit 44 stores the acquired injection point boundary conditions in the molding-machine-unique information storage unit 41 as machine difference information.

Figure 17:
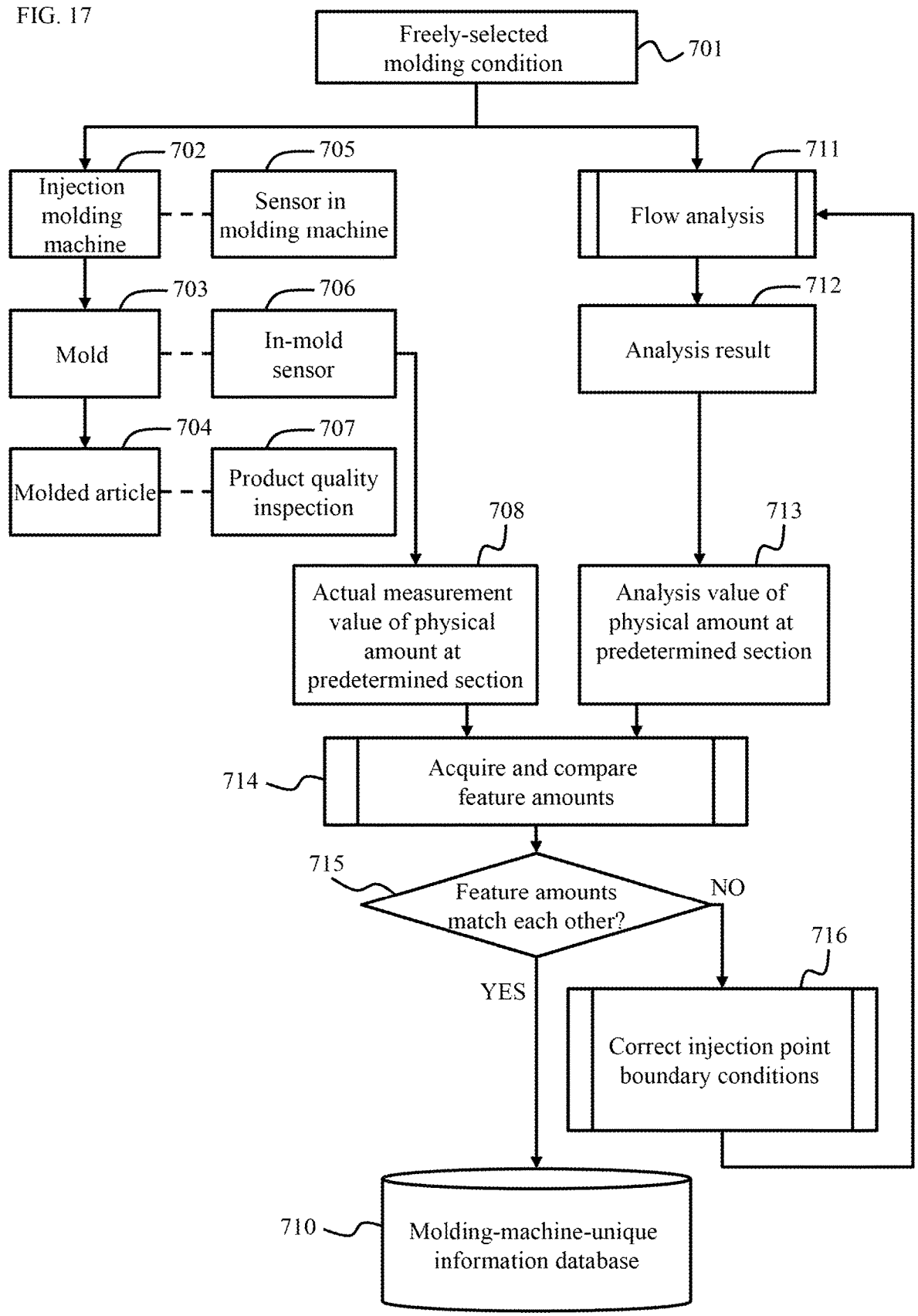
FIG. 17 is a block diagram illustrating a method of acquiring molding-machine-unique information.

FIG. 17 is a block diagram illustrating an example of a method of acquiring the molding-machine-unique information of the injection molding machine according to this embodiment. The method of acquiring the molding-machine-unique information illustrated in FIG. 17 is implemented by combining a "mold with a sensor" or a "mold with a built-in sensor" in which a sensor that measures a predetermined physical amount at a predetermined position is provided and a flow analysis simulating those mold structures, for example.

First, with the abovementioned procedure, the actual measurement value of the physical amount at the predetermined section in the mold is acquired by inputting the freely-selected molding condition 701 to the actual injection molding machine 702 (708). Then, the analysis value of the physical amount at the predetermined section in the mold is acquired from an analysis result 712 acquired by inputting the freely-selected molding condition 701 to a flow analysis 711 (713). The flow analysis 711 corresponds to processing of the flow analysis unit 45. The analysis result 712 is recorded on the analysis result storage unit 46.

The feature amount for comparing the actual measurement value and the analysis value with each other is acquired from the actual measurement value and the analysis value of the physical amount that are acquired (714), and it is determined whether the actual measurement value and the analysis value match each other (715). When the actual measurement value and analysis value do not match each other (715: NO), the injection point boundary conditions in which the analysis conditions are corrected are generated so that the feature amount of the analysis value matches with the feature amount of the actual measurement value (716). The processing from the flow analysis 711 to the generation 716 of the injection point boundary conditions is repeatedly executed with use of the generated correction molding conditions until the feature amount of the analysis value and the feature amount of the actual measurement value match each other.

When the feature amount of the analysis value and the feature amount of the actual measurement value match each other (715: YES), the acquired injection point boundary conditions and the freely-selected molding condition that is input first are associated with each other and are recorded on the molding-machine-unique information database 710. The acquired feature amounts may be associated with each other and registered with the molding-machine-unique information database 710.

Figure 18:
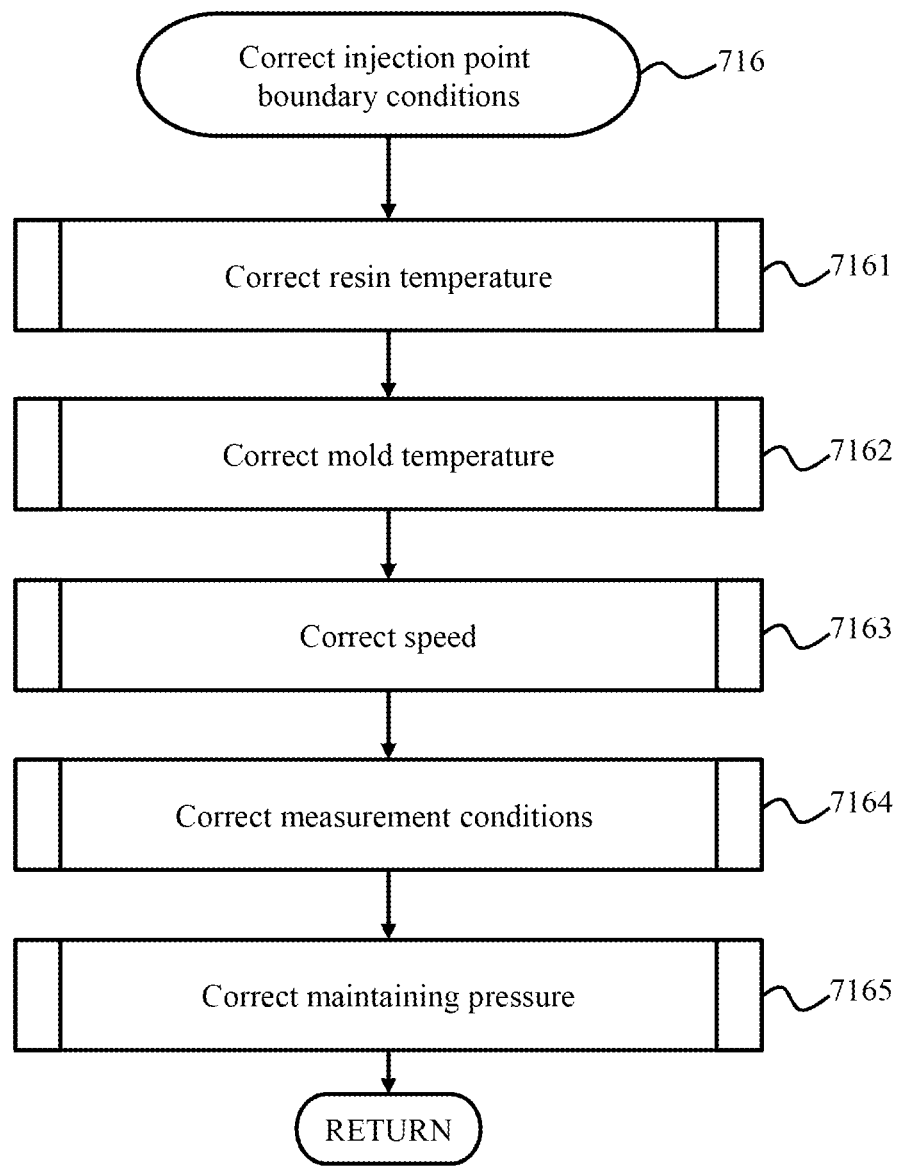
FIG. 18 is a flowchart illustrating a method of correcting injection point boundary conditions.

With reference to FIG. 18, a method of generating the injection point boundary conditions is described. FIG. 18 is a flowchart illustrating details of Step 716 in FIG. 17.

The molding-machine-unique information learning unit 44 corrects the resin temperature (7161). In Step 7161, the molding-machine-unique information learning unit 44 configures the resin temperature in the injection point boundary conditions so that the feature amount of the actual measurement value and the feature amount of the analysis value match each other. The molding-machine-unique information learning unit 44 refers to the maximum value of the resin temperature out of the acquired feature amounts, for example, and performs optimization calculation of which variable is the resin temperature so that the difference between the actual measurement value and the analysis value becomes the minimum.

The molding-machine-unique information learning unit 44 corrects the mold temperature (7162). In Step 7162, the molding-machine-unique information learning unit 44 configures the mold temperature in the injection point boundary conditions so that the feature amount of the actual measurement value and the feature amount of the analysis value match each other. For example, the molding-machine-unique information learning unit 44 refers to the maximum value of the mold temperature out of the acquired feature amount, and performs optimization calculation of which variable is the mold initial temperature, the refrigerant temperature, the refrigerant flow rate, the room temperature, and the like so that the difference between the actual measurement value and the analysis value becomes the minimum. However, those parameters are acquired as the actual measurement values, and hence the calculation time can be reduced by inputting the actual measurement values from the start.

The molding-machine-unique information learning unit 44 corrects the injection speed (7163). In Step 7163, the injection speed in the injection point boundary conditions is configured so that the feature amount of the actual measurement value and the feature amount of the analysis value match each other. The molding-machine-unique information learning unit 44 refers to the maximum derivative value of the resin temperature out of the acquired feature amount, for example, and performs optimization calculation of which variable is the injection speed so that the difference between the actual measurement value and the analysis value becomes the minimum.

The molding-machine-unique information learning unit 44 corrects the measurement conditions (7164). In Step 7164, the molding-machine-unique information learning unit 44 configures the VP switching position in the injection point boundary conditions so that the feature amount of the actual measurement value and the feature amount of the analysis value match each other. The molding-machine-unique information learning unit 44 refers to the maximum derivative value of the pressure out of the acquired feature amount, for example, and performs optimization calculation of which variable is the VP switching position so that the difference between the actual measurement value and the analysis value becomes the minimum.

The molding-machine-unique information learning unit 44 corrects the maintaining pressure and the pressure maintenance time (7165). In Step 7165, the molding-machine-unique information learning unit 44 configures the maintaining pressure and the pressure maintenance time in the injection point boundary conditions so that the feature amount of the actual measurement value and the feature amount of the analysis value match each other. The molding-machine-unique information learning unit 44 refers to the integral value and the maximum value of the pressure out of the acquired feature amount, for example, and performs optimization calculation of which variable is the maintaining pressure and the pressure maintenance time so that the difference between the actual measurement value and the analysis value becomes the minimum.

By the procedures above, the injection point boundary conditions with which the feature amount of the actual measurement value of the physical amount and the feature amount of the analysis value match each other at the predetermined section in the mold can be acquired with a small amount of time. For example, when the pressure is corrected before the temperature, the correction of the pressure needs to be redone after the temperature is corrected because the time variation of the pressure in the mold differs depending on the temperature. As a result, the calculate time increases. Meanwhile, in this embodiment, the temperature is corrected first, and hence the boundary condition of the injection point can be calculated in a short time.

This embodiment configured as described above also exhibits an effect similar to that of Embodiment 1. According to this embodiment, a freely-selected place in the mold can be set to the measurement section without the restriction of the abovementioned measurement section. Even when a sensor is installed in the sprue portion or the runner portion, the pressure at the resin inflow port can be acquired with a higher accuracy in consideration of the amount of the pressure loss in the mold. Therefore, in this embodiment, in order to acquire the molding-machine-unique information database 710, an existing mold can be used, and a mold with a freely-selected shape can be used. In this embodiment, when the machine difference correction is performed for another mold with use of the acquired molding-machine-unique information database 710, a more-accurate correction can be performed regardless of the structure of the mold. Note that, in this embodiment, the molding-machine-unique information database 710 can be constructed independently of the actual production result described in Embodiment 1.

Embodiment 5

Figure 19:
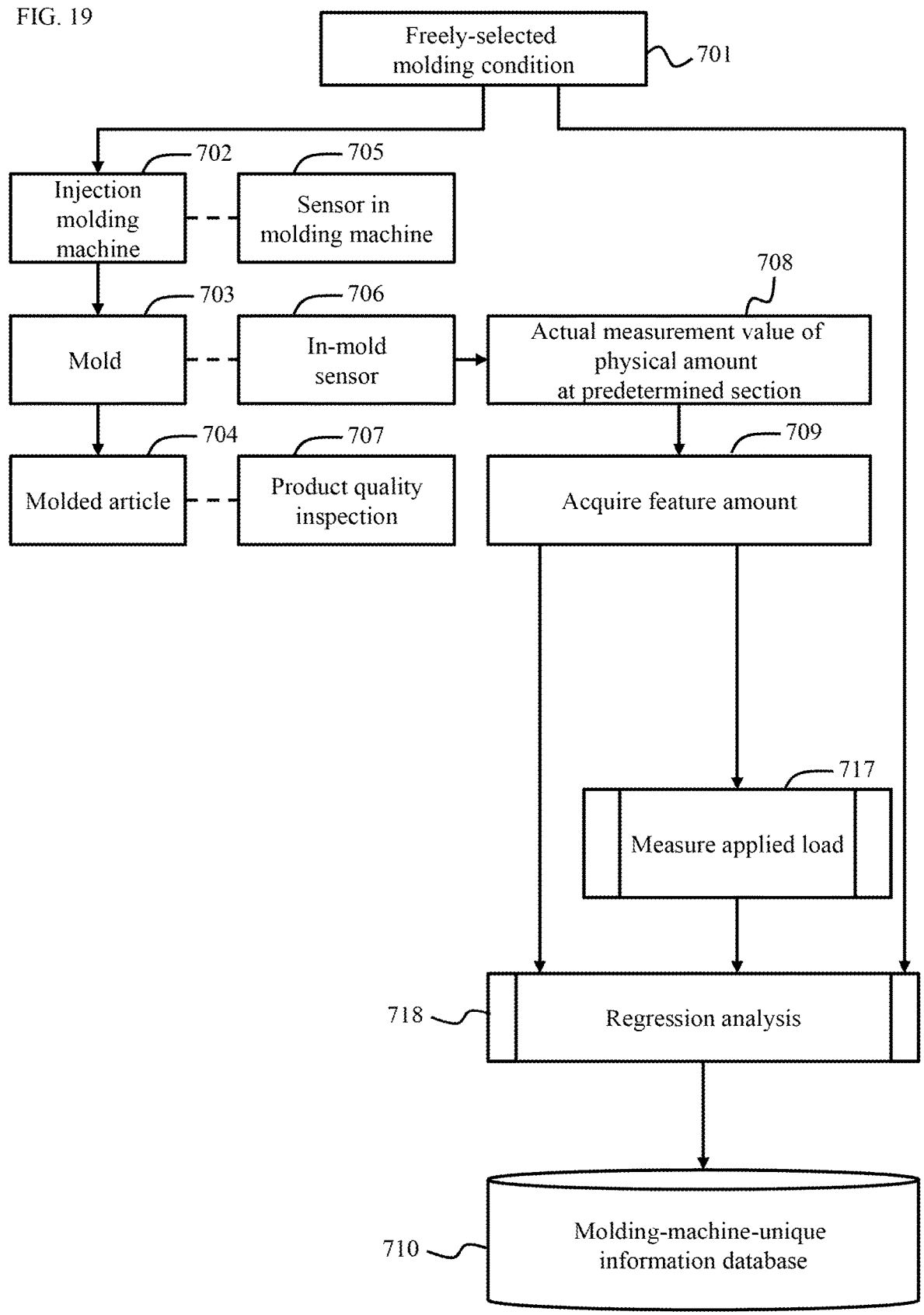
FIG. 19 is a block diagram illustrating a method of acquiring molding-machine-unique information according to Embodiment 5.

Embodiment 5 is described with reference to FIG. 19 to FIG. 21. The inventors have found that the remaining mold displacement amount and the maximum mold displacement amount acquired by the abovementioned experiment have a correlation with the molded article weight, and are machine difference factors of the molding machine. With use of this knowledge, the machine difference correction can be performed with more accuracy by matching the mold displacement amount with the applied load in the actual production result when the machine difference correction is performed.

In this embodiment, when the mold clamping force is corrected, the configured mold clamping force, the necessary mold clamping force (the force applied in the mold), and the mold displacement amount are associated with each other and are registered with the molding-machine-unique information database 710 in addition to the abovementioned effective mold clamping force. FIG. 19 is a block diagram illustrating an example of a method of acquiring the molding-machine-unique information of the injection molding machine according to this embodiment.

First, with the abovementioned procedure, the actual measurement value of the physical amount at the predetermined section in the mold is acquired by inputting the freely-selected molding condition 701 to the actual injection molding machine 702 (708). The feature amount is acquired from the acquired physical amount (709). In this embodiment, the peak pressure, the maximum mold displacement amount, and the remaining mold displacement amount are acquired as the feature amount.

Next, the force applied in the mold (applied load) is calculated from the acquired peak pressure and Expression 1 (717). Alternatively, the pressure distribution in the mold may be acquired by executing the flow analysis, and the applied load may be calculated by Expression 2.

Regarding the relationship of the maximum mold displacement amount or the remaining mold displacement amount with the acquired applied load and the configured mold clamping force of the freely-selected molding condition 701, regression analysis for a freely-selected model formula is performed (718). As the model formula, a curved-surface polynomial model can be used, for example.

Figure 20:
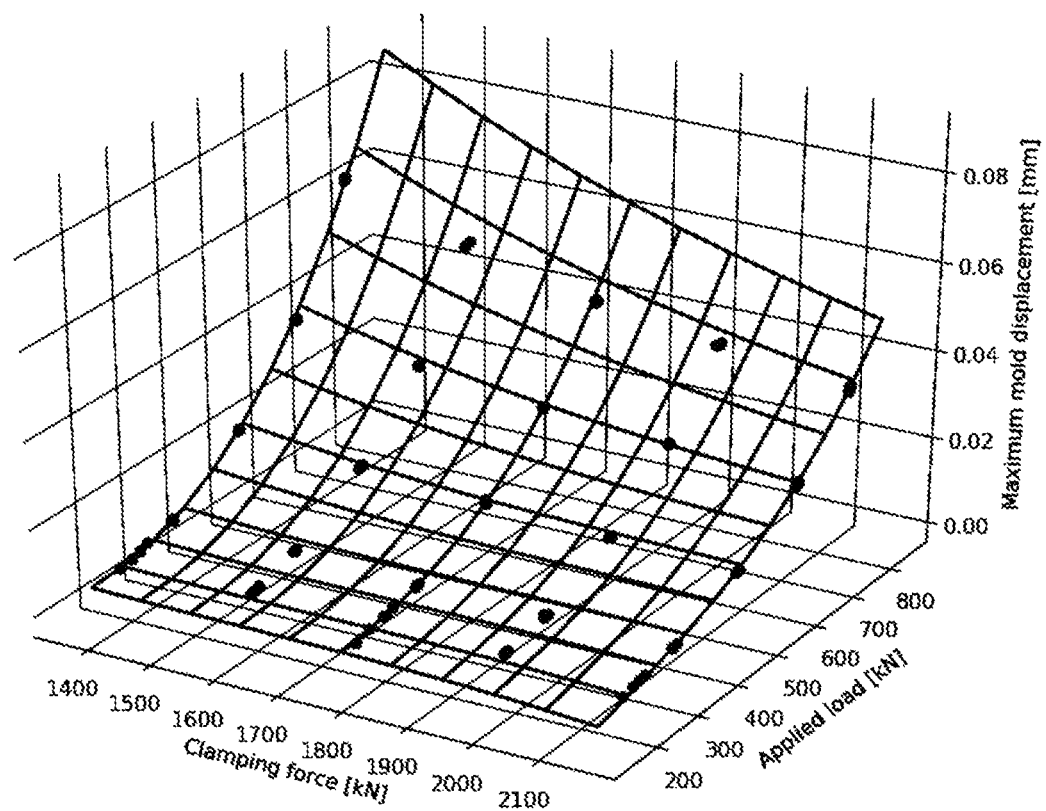
FIG. 20 is a graph showing experiment values of the maximum mold displacement amount with respect to the configured mold clamping force and the applied load and the result of regression analysis in accordance with a curved-surface polynomial model.

FIG. 20 is a graph showing the results of the regression analysis in accordance with a curved-surface polynomial model and the experiment values of the maximum mold displacement amount with respect to the configured mold clamping force and the applied load according to this embodiment. Satisfactory fitting is performed in accordance with a three-dimensional curved-surface polynomial model expressed in Expression 13 and the result of acquiring the applied load and the maximum mold displacement amount with respect to various configured mold clamping forces and maintaining pressures.

$$Z(A,B) = P00 + P10 \times A + P01 \times B + P20 \times A^2 + P11 \times A \times B + P02 \times B^2 + P30 \times A^3 + P21 \times A^2 \times B + P12 \times A \times B^2 + P03 \times B^3 \quad \text{(Expression 13)}$$

Here, Z represents a fitting function (the maximum mold displacement amount here), A represents the configured mold clamping force, B represents the applied load, and P00, P10, P01, P11, P20, P02, P30, P21, P12, and P03 are fitting coefficients. By acquiring the coefficients fitting by fitting the experiment values in accordance with the regression equation as in Expression 13, the maximum mold displacement amount unique to the molding machine with respect to the freely-selected configured mold clamping force and applied load can be predicted.

The configured mold clamping force, the applied load, and the mold displacement amount that are acquired are associated with each other, and are recorded on the molding-machine-unique information database 710. At this time, the fitting coefficients and the model formula acquired by the regression analysis may be also registered with the molding-machine-unique information database 710. The maximum mold displacement amount and the remaining mold displacement amount have a correlation with each other, and hence either one or both are registered with the database 710 as the mold displacement amount.

Note that the mold displacement amount acquired by the "mold with a sensor" or the "mold with a built-in sensor" is a value unique to the used mold, and the absolute amount differs depending on the structure of the mold. Meanwhile, the difference in the mold displacement amount between molding machines that appear when the same mold is used is conceived to occur due to the rigidity differing depending on the structure of the molding machine. Therefore, the mold displacement amount acquired with use of the same mold can be understood to be parameters relatively indicating the rigidity of the molding machine. In other words, the machine difference correction cannot be accurately performed even with use of the database of the mold displacement amount acquired with use of different molds. In this case, the machine difference correction using a database acquired with use of different molds can be performed by standardizing the acquired mold displacement amount in accordance with the rigidity of the mold.

Figure 21:
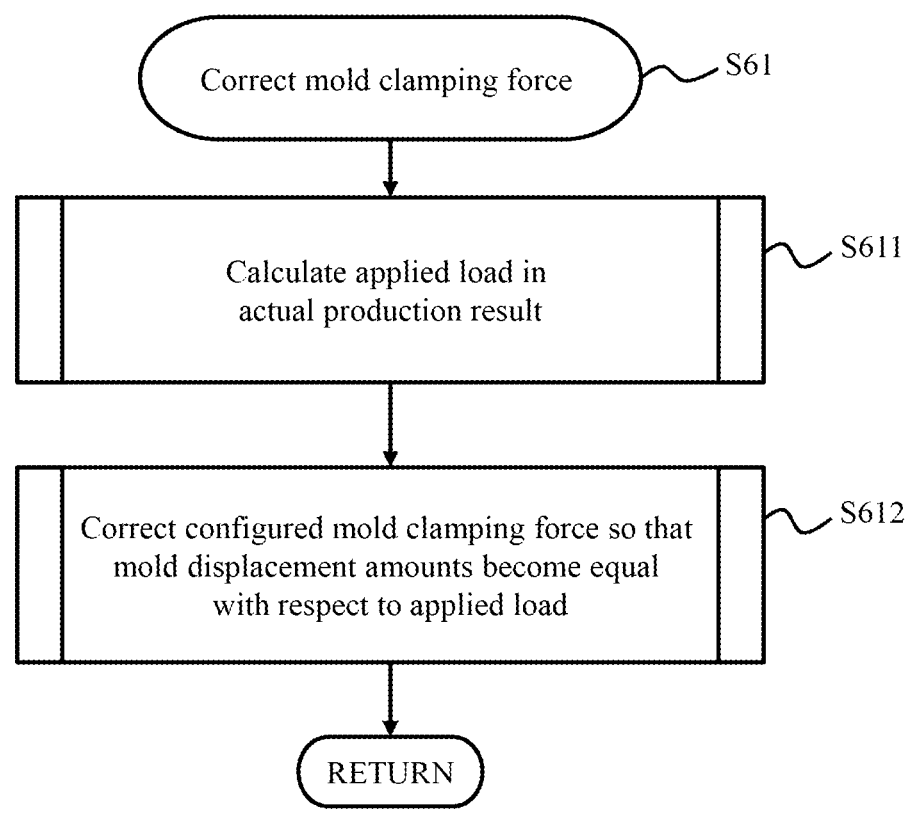
FIG. 21 is a flowchart illustrating details of Step S61 in FIG. 11.

FIG. 21 illustrates a flowchart of details of Step S61 in FIG. 11.

The molding condition correction unit 43 calculates the applied load in the input actual production result (S611). The molding condition correction unit 43 refers to the molding-machine-unique information database 710 acquired by a method in Embodiment 4, for example, and acquires the injection point boundary conditions of the second injection molding machine in the actual production result. Next, the molding condition correction unit 43 performs the flow analysis on the basis of the acquired injection point boundary conditions and the mold structure. The applied load is acquired from the acquired pressure distribution in accordance with Expression 2. Alternatively, the applied load may be calculated in accordance with Expression 1 when the cavity pressure is acquired in the actual production result.

The molding condition correction unit 43 corrects the configured mold clamping force so that the mold displacement amounts become equal with respect to the acquired applied load (S612). In order to cause the applied loads in the first molding machine and the second molding machine to become equal by the machine difference correction, the applied load of the second molding machine acquired in Step S611 is assumed to be applied to the first molding machine. First, the molding condition correction unit 43 acquires the configuration value of the mold clamping force of the second injection molding machine and the maximum mold displacement amount with respect to the applied load from the molding-machine-unique information database 710. Next, the molding condition correction unit 43 refers to the molding-machine-unique information database 710, and inputs the acquired applied load and maximum mold displacement amount, to thereby acquire the configured mold clamping force of the first molding machine.

This embodiment configured as described above also exhibits an effect similar to that of Embodiment 1. According to this embodiment, the mold displacement amounts can be caused to match with respect to he applied load in the actual production result, and hence the machine difference correction can be performed with more accuracy.

Note that the present invention is not limited to the abovementioned embodiments, and includes various modifications. For example, the abovementioned embodiments are described in detail in order to describe the present invention in a way that is easy to understand, and are not necessarily limited to include all of the described configurations. Some configurations of a certain embodiment can be replaced with configurations of another embodiment, and configurations of a certain embodiment can be added to configurations of another embodiment. Other configurations can be added to some configurations of the embodiments, and some configurations of the embodiments can be removed or replaced.

The present invention can be expressed as below, for example.

Expression 1. A molding condition correction system, including at least one computer each including a microprocessor and a storage apparatus, in which:
the molding condition correction system:
corrects a molding condition to be input to an injection molding machine;
is activated when a first actual production result acquired with use of a combination of a first mold and a first injection molding machine does not exist; and
corrects the molding condition on the basis of first molding-machine-unique information acquired in advance for the first injection molding machine, second molding-machine-unique information acquired in advance for a second injection molding machine with which a second actual production result is acquired in combination with the first mold, and the second actual production result; and
the molding-machine-unique information is information in which an actual measurement value of a physical amount at a predetermined section in a mold mounted on an injection molding machine when injection molding is performed by inputting the freely-selected molding condition to the injection molding machine, and a freely-selected molding condition are associated with each other.

Expression 2. The molding condition correction system according to Expression 1, in which the physical amount includes at least one of a mold displacement amount, temperature, or pressure.

Expression 3. The molding condition correction system according to Expression 2, in which the physical amount includes at least one of a mold displacement amount after cooling, a peak pressure, a peak temperature, a maximum derivative value of pressure, a maximum derivative value of temperature, or an integral value of pressure.

Expression 4. The molding condition correction system according to Expression 3, in which:

the physical amount includes a mold clamping force, temperature, speed, and pressure; and
the molding condition is corrected by correcting the mold clamping force, the temperature, the speed, and the pressure in a predetermined order on the basis of the first molding-machine-unique information, the second molding-machine-unique information, and the second actual production result.

Expression 5. A molding condition correction system, including at least one computer each including a microprocessor and a storage apparatus, the molding condition correction system:
correcting a molding condition to be input to an injection molding machine;
being activated when a first actual production result acquired with use of a combination of a first mold and a first injection molding machine does not exist;
correcting the molding condition on the basis of first molding-machine-unique information acquired in advance for the first injection molding machine, second molding-machine-unique information acquired in advance for a second injection molding machine with which a second actual production result is acquired in combination with the first mold, and the second actual production result;
further acquiring predetermined information relating to the first mold and the first injection molding machine; and
correcting the molding condition on the basis of the first molding-machine-unique information acquired in advance for the first injection molding machine, the second molding-machine-unique information acquired in advance for the second injection molding machine with which the second actual production result is acquired in combination with the first mold, the second actual production result, and the predetermined information.

In the injection molding system, the physical amount may include temperature, speed, and pressure, and the injection point boundary conditions may be generated by correcting the temperature, the speed, and the pressure in a predetermined order so that the actual measurement value and the analysis value of the physical amount match each other.

The predetermined order may be an order of the mold clamping force, the temperature, the speed, and the pressure.

The molding-machine-unique information may be information in which the configured mold clamping force in the freely-selected molding condition and the actual measurement value of the mold displacement amount at another predetermined section (predetermined position) in the mold are associated with each other when the pressure of the integral of the projected area of the cavity when an analysis value analyzed for a physical amount at the predetermined section of the injection molding machine matches with an actual measurement value of a physical amount at a predetermined section in the mold mounted on the injection molding machine is the applied load in addition to the molding-machine-unique information.

All of the features described regarding the injection molding system can also be described as the features of the molding condition correction system. The combination of the features disclosed in this embodiment is not limited to the description of the claims.

What is claimed is:
1. An injection molding system, comprising:
at least one computer including a microprocessor; and a storage apparatus storing processor-executable instructions, wherein when the instructions are executed by the microprocessor, the at least one computer is configured to:

determine based on a production schedule, a manufacturing condition that specifies a first combination of a first specific mold and a first specific injection molding machine to perform a scheduled injection molding;

check whether or not a first actual production result was achieved in an injection molding performed using the first combination by searching an actual production result storage unit; and if the first actual production result was achieved, generate a correction molding condition for performing the scheduled injection molding using the first combination on the basis of first stored molding-machine-unique information acquired in advance for the first injection molding machine, and if the first actual production result was not achieved:
  generate the correction molding condition based on second stored molding-machine-unique information acquired in advance for a second injection molding machine with which a second actual production result was achieved in an injection molding performed using the second injection molding machine in combination with the first mold, wherein the second actual production result is acquired from the actual production result storage unit; and
  input to the first injection molding machine, the correction molding condition generated for the second injection molding machine whereby the scheduled injection molding is performed using the first injection molding machine in combination with the first mold.

2. The injection molding system according to claim 1, wherein the microprocessor is further configured to:
register a quality inspection result of a product that has been injection-molded by the second injection molding machine in accordance with the correction molding condition, wherein the actual production result is stored in the storage unit.

3. The injection molding system according to claim 2, wherein the molding-machine-unique information is information in which an actual measurement value of a physical amount at a predetermined section in a mold mounted on an injection molding machine when injection molding is performed by inputting a freely-selected molding condition to the injection molding machine, and a freely-selected molding condition are associated with each other.

4. The injection molding system according to claim 3, wherein the physical amount includes at least any one of a mold displacement amount, temperature, or pressure.

5. The injection molding system according to claim 4, wherein the physical amount includes at least any one of a mold displacement amount after cooling, a peak pressure, a peak temperature, a maximum derivative value of pressure, a maximum derivative value of temperature, or an integral value of pressure.

6. The injection molding system according to claim 3, wherein:
the physical amount includes a mold clamping force, temperature, speed, and pressure; and
the generating the correction molding condition includes generating the correction molding condition by correcting the mold clamping force, the temperature, the speed, and the pressure in a predetermined order on the basis of the first molding-machine-unique information, the second molding-machine-unique information, and the second actual production result.

7. The injection molding system according to claim 6, wherein the predetermined order is an order of the mold clamping force, the temperature, the speed, and the pressure.

8. The injection molding system according to claim 1, wherein to generate the correction molding condition, the microprocessor is further configured to:
access predetermined information relating to the first mold and the first injection molding machine; and
in case the first actual production result does not exist, generate the correction molding condition on the basis of the first molding-machine-unique information, the second molding-machine-unique information, the second actual production result, and the predetermined information.

9. The injection molding system according to claim 1, wherein the at least one computer comprises at least two computers and wherein:
a first predetermined computer included in the at least two computers is configured to:
  determine the manufacturing condition; and
  check whether or not the first actual production result exists by searching the actual production result storage unit; and
a second predetermined computer included in the at least two computers is configured to generate the correction molding condition.

10. The injection molding system according to claim 1, wherein the molding-machine-unique information is information calculated on the basis of a difference between an actual measurement value of a physical amount at a predetermined section in a mold mounted on the injection molding machine, and an analysis value analyzed for the predetermined physical amount at the predetermined section of the injection molding machine when injection molding is performed by inputting a freely-selected molding condition to the injection molding machine.

11. The injection molding system according to claim 10, wherein the molding-machine-unique information is information including a physical amount in an injection point boundary condition of the analysis when an analysis value analyzed for a physical amount at the predetermined section of the injection molding machine matches with an actual measurement value of a physical amount at a predetermined section in the mold mounted on the injection molding machine when injection molding is performed by inputting the freely-selected molding condition to the injection molding machine.

12. The injection molding system according to claim 3, wherein the molding-machine-unique information is information in which a pressure of the physical amount of the actual measurement value at a predetermined section in the mold, an applied load calculated from a projected area in a cavity, a configured mold clamping force of the freely-selected molding condition, and an actual measurement value of a mold displacement amount at another predetermined section in the mold are associated with each other in addition to the molding-machine-unique information.

13. The injection molding system according to claim 12, wherein the microprocessor is further configured to:
calculate an applied load and a second mold displacement amount on the basis of the second molding-machine-unique information, the second actual production result, and a projected area of the first mold; and
correct a first configured mold clamping force out of correction molding conditions for performing injection molding with use of the first combination on the basis of the first molding-machine-unique information, the applied load, and the second mold displacement amount.

14. A molding condition correction system, comprising at least one computer including a microprocessor and a storage apparatus storing processor-executable instructions, wherein when the instructions are executed by the microprocessor, the at least one computer is configured to:
correct a molding condition to be input to an injection molding machine scheduled for an injection molding;
activate the molding condition correction system in response to determining that a first actual production result achieved using a combination of a first mold and a first injection molding machine does not exist;
correct a first molding condition to be input to the first injection molding machine for performing the scheduled injection molding on the basis of first molding-machine-unique information acquired in advance for the first injection molding machine, second molding-machine-unique information acquired in advance for a second injection molding machine with which a second actual production result was acquired using a combination of the second injection molding machine and the first mold, and the second actual production result.

* * * * *